United States Patent Office 3,606,693
Patented Sept. 21, 1971

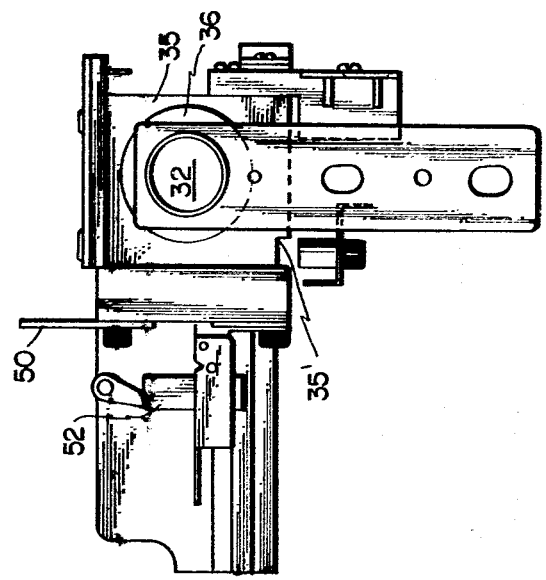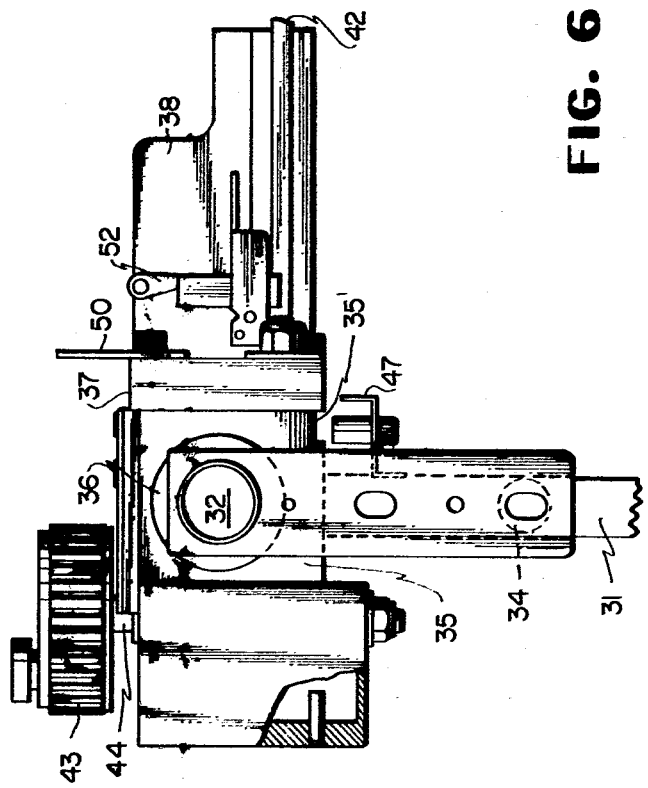
FIG. 6

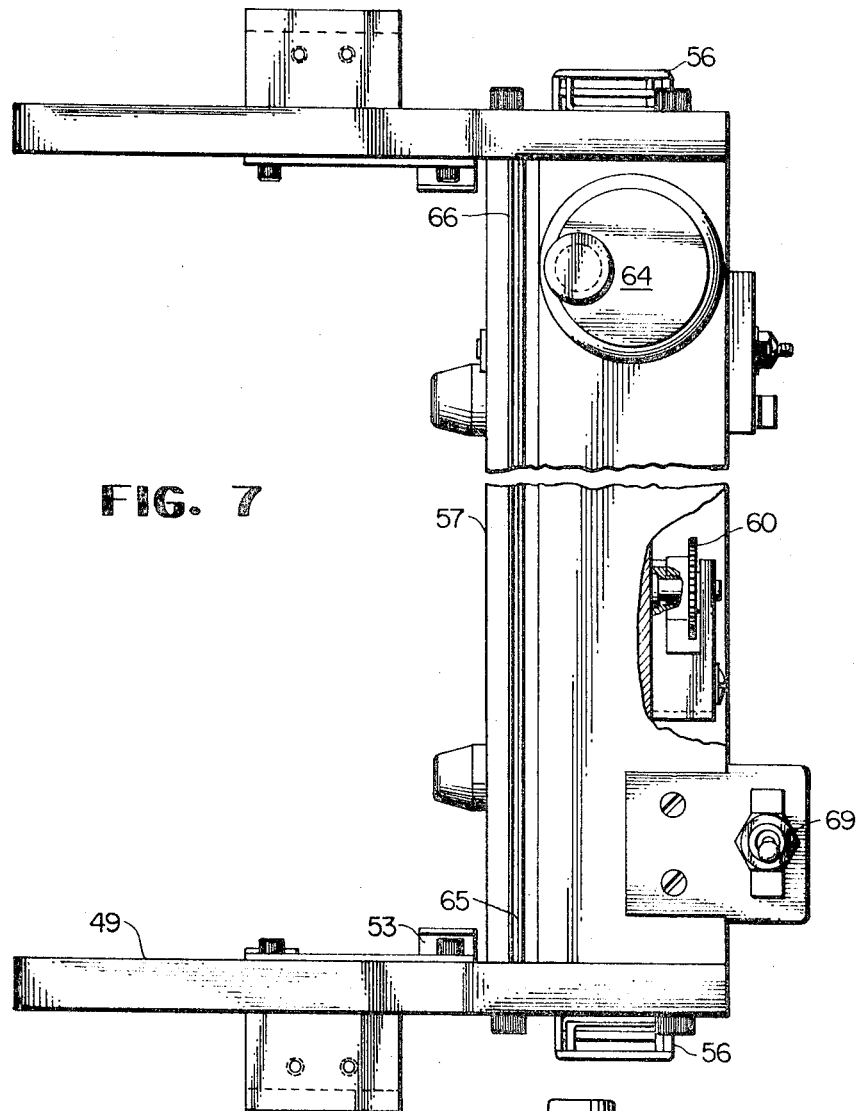
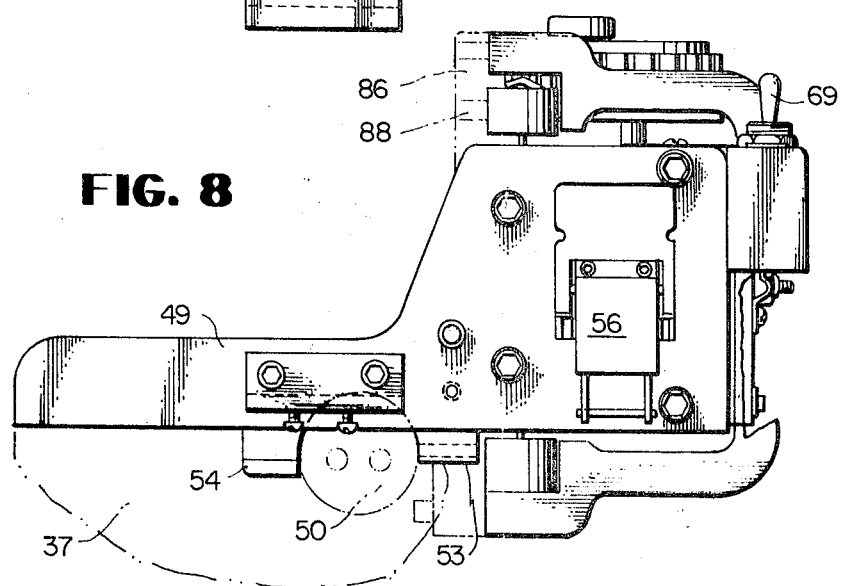

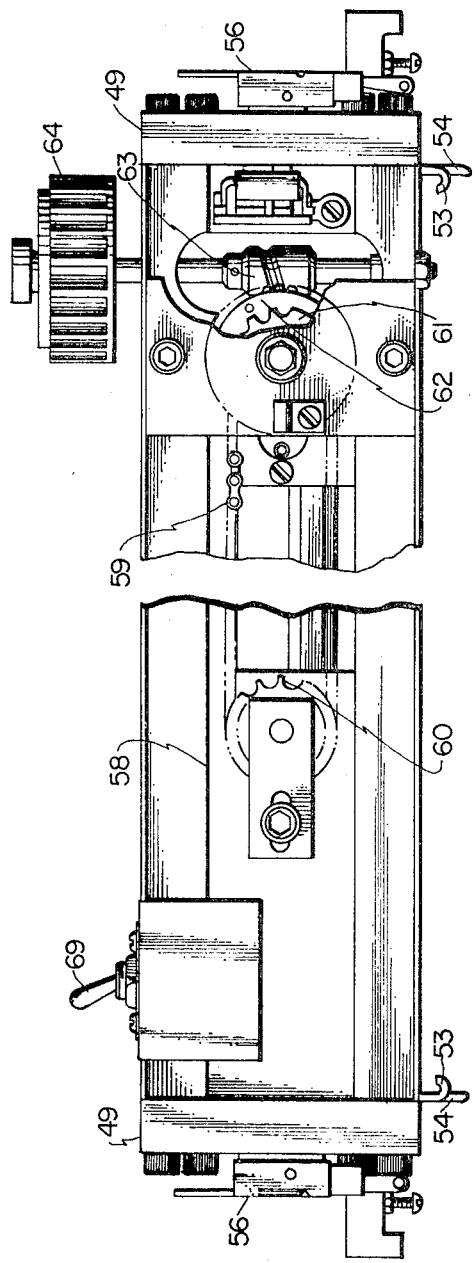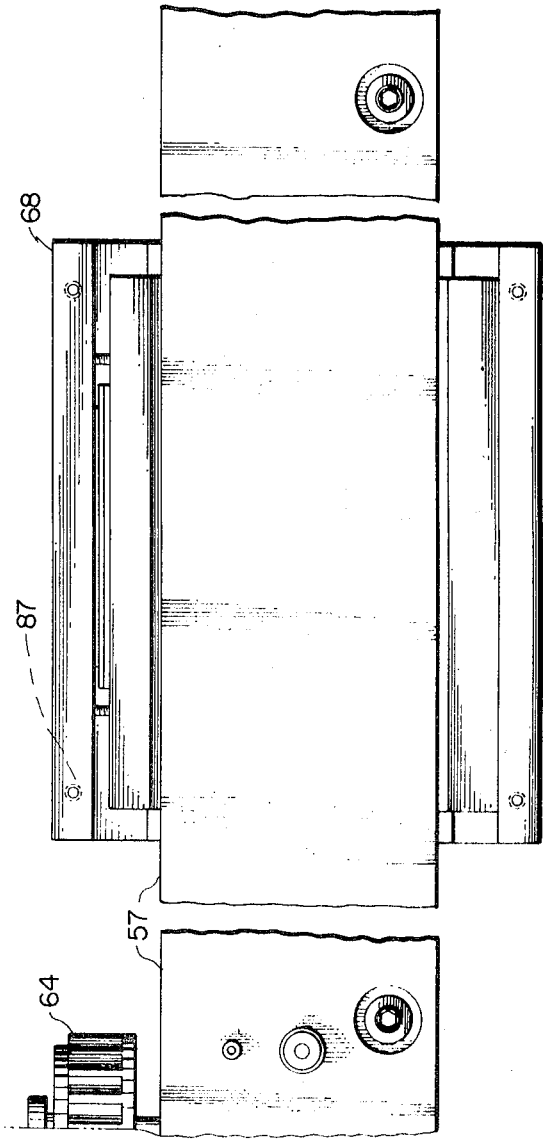
FIG. 9
FIG. 10

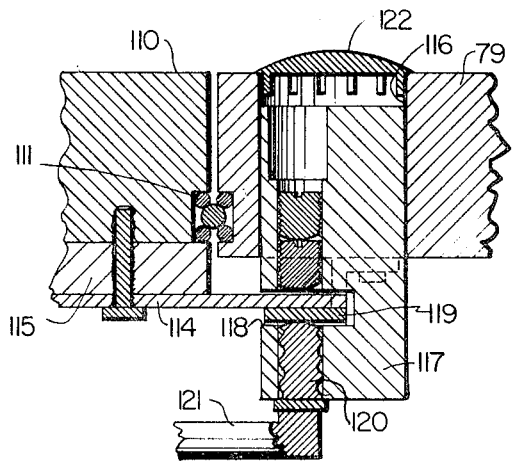
FIG. 15
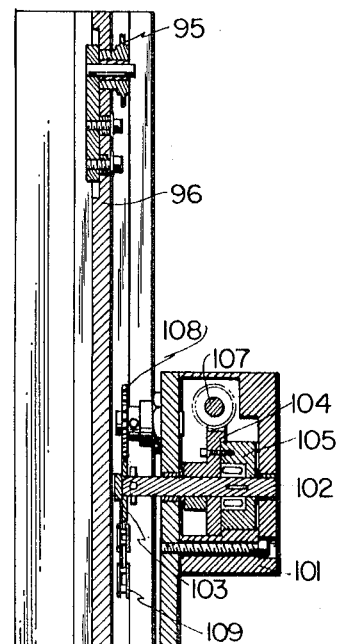
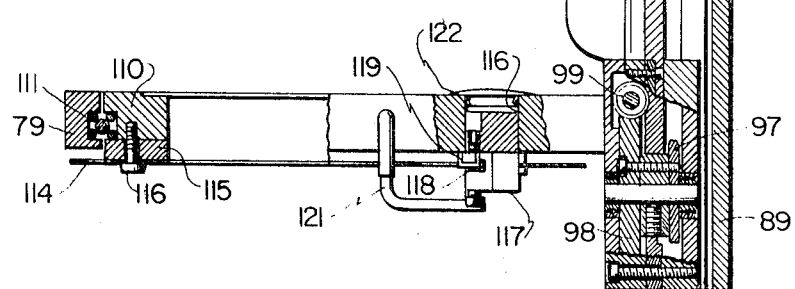
FIG. 14

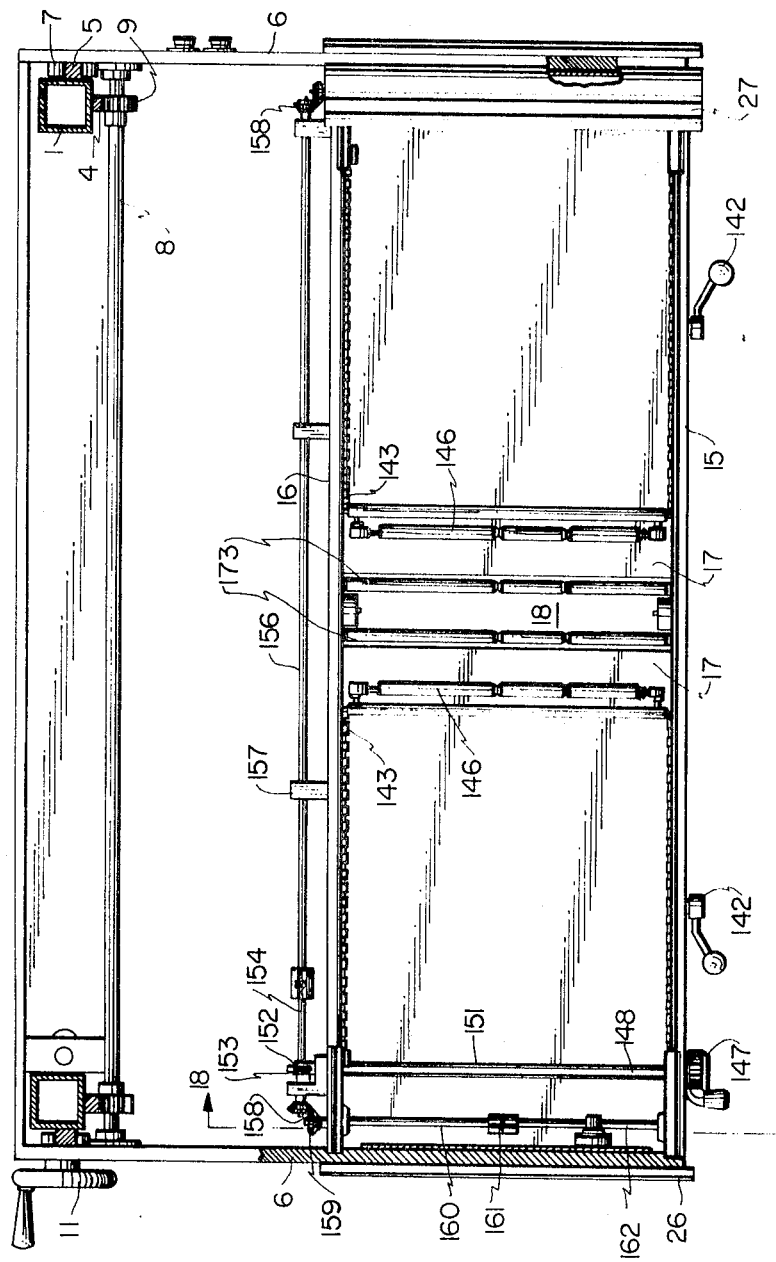

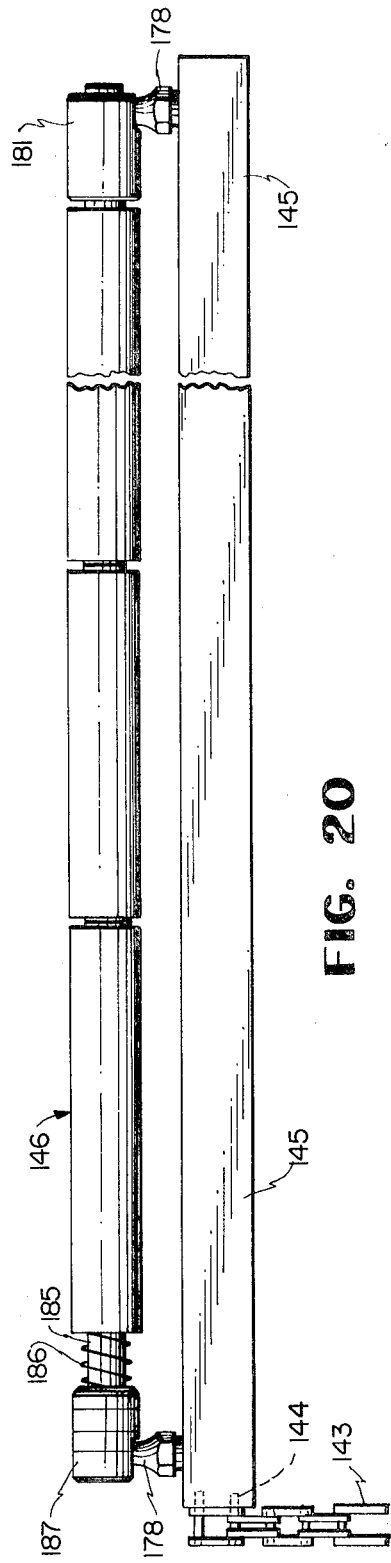
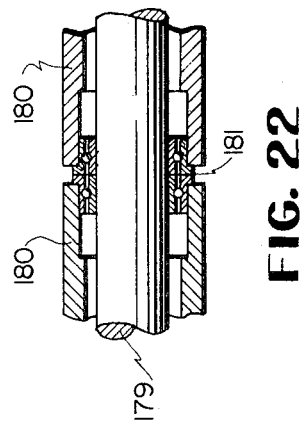
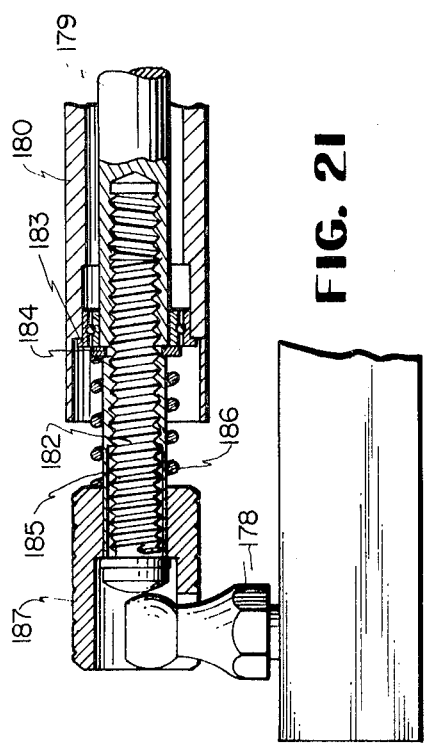

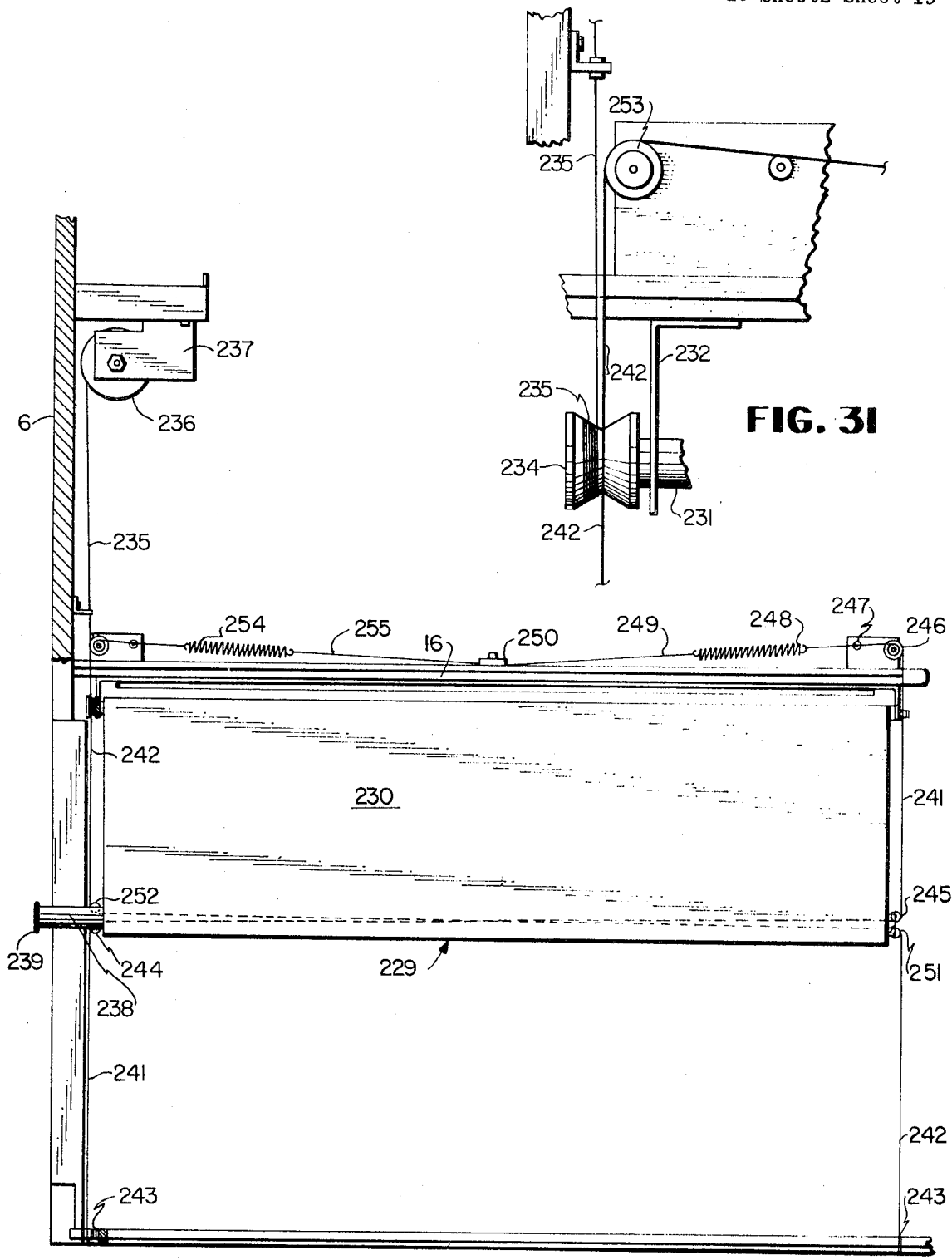

3,606,693
FILM VIEWING MEANS
David D. Grimes, Fairfax, and Earl E. Kasdorf, Falls Church, Va., assignors to The Richards Corporation, McLean, Va.
Filed Mar. 10, 1969, Ser. No. 805,491
Int. Cl. G09f *11/28*
U.S. Cl. 40—31
22 Claims

ABSTRACT OF THE DISCLOSURE

A film viewing means for viewing large films for interpretation, especially stereo interpretation, of aerial photographs and the like which includes a film handling table containing illumination means that produce optimum light intensity over prolonged periods of time via oil immersed light tubes, a shiftable viewing stage and associated film transport means including a compact film loop take-up arrangement which in cooperation with the shiftable stage provides all possible film threading configurations. A master overhead carriage system is included that features a quick release coupling between an X travel unit and a Y travel unit, and a Z travel instrument carrying unit on the X travel unit having a rotary instrument supporting ring. The mounting and feed arrangement for the carriage and associated instrument carrying unit is provided which produces zero backlash in X, Y and Z travels, provides for coarse and fine adjustments in the Z travel via a gravity feed, thus preventing feeding of the instrument into the stage while permitting rapid instrument elevation, and a manually operated clamp or lock is included for adjusting the instrument around the Z axis. Further an electrical clutching arrangement is provided which automatically couples X and Y fine feed means and includes an electrical decoupling, permitting rapid instrument positioning along the X and Y axes.

The present invention relates broadly to film viewing means and more particularly this invention relates to film viewing means including stereo viewing means for viewing large films, for instance in interpretation of aerial photographs, surveys and the like.

Still more particularly this invention relates to such a film viewing apparatus that is transilluminated in that the light from a light source passes through the film.

The invention in geenral comprises a film handling table, illumination sources and controls therefor, film transport means, carriage means for a viewing means support that permits X and Y travel over the film handling table, means associated with the viewing means support for permitting Z travel and adjustments of the film viewing means therein, and means for controlling the X, Y and Z travels.

Accordingly, a primary object of this invention is to provide a film viewing apparatus that includes improved illumination, film transport and film viewing over a wide range of X, Y and Z travels.

It is a further object of this invention to provide a modular film viewing system which incorporates sub assemblies or units that permit the user to select the combination of table configuration, film stage, light source and film transport means that is best suited to his purposes.

Consistent with the aforegoing object, it is a further object of this invention to provide master overhead carriage arrangement that accommodates virtually all optical systems, such as Bausch & Lomb's Stereozoom, Zoom 70 (including 2X wide span attachment), Zoom 95, Zoom 240 (all configurations), and Dynazooms; Wild M-5; Olympus SZ 3; and Richards Stereodapters (for Zoom 70 or SZ3).

It is a further specific object to provide such a master carriage arrangement including an instrument support that ensures coarse and fine focus arrangement, and one that includes electric locks on Z and Y travel interlocked with positive fine positioning drives.

An additional object is to provide an instrument support that embodies an improved clamping or locking means for positional adjustment of the instrument around the Z axis of such structure that adjustments can be effected and the instrument clamped or locked in place without disturbing the Z axis.

A still further object is to provide a master carriage which includes a gravity-type focussing mechanism that precludes dropping the viewing instrument while making focus adjustments or jamming the instrument into the viewing stage during operation, with resultant damage to the optics, film or light stage.

A further object of this invention is to include in such master carriage arrangement a bridge structure that is removable without disturbing collimation, for purposes of shipment or in instances when optical instruments are not required.

A more specific object is to provide a mounting and feed arrangement for the carriage and instrument support that produces zero backlash in motions in X, Y and Z directions.

Another object of this invention is to provide a film viewing apparatus with an improved film transport arrangement including a film take-up that is more compact in construction and one which incorporates features that do not unduly intrude in the space above the film transport level.

A still further object is to provide a film viewing apparatus of the type mentioned above which includes an improved light source arrangement incldinig features that permit maximum light intensity output over prolonged periods of time.

Another object is to provide a film viewing apparatus with an improved viewing stage arrangement that enables the film transport mechanism to provide for either conventional, split vertical, long take-up or short take-up threading arrangements.

An additional object is to incorporate a masking arrangement to reduce extraneous light when viewing film.

Further and more specific objects and advantages will be apparent from the following description taken in connection with the accompanying drawings in which:

FIG. 6 is a front view of the arrangement of FIG. 4;

FIG. 7 is a plan view of the X travel sub assembly partially broken away and as seen from the above and with parts removed;

FIG. 8 is a side view of the arrangement of FIG. 7 as seen from the right illustrating the housing that carries the Z travel components and diagrammatically illustrating the cooperating positioning and aligning components on the X and Y sub assemblies;

FIG. 9 is a rear elevational view, partially broken away, of the sub assembly shown in FIG. 7;

FIG. 10 is a fragmentary view of the Y travel sub assembly as seen from the left of FIG. 8;

FIG. 14 is a vertical sectional view taken along line 14—14 of FIFG. 12;

FIG. 15 is a fragmentary vertical cross sectional view taken generally through the section line 15—15 in FIG. 3 and illustrating the rotary ring locking means on an enlarged scale;

FIG. 17 is a view from beneath the film viewer illustrating the film loop take-up arrangement and with parts of the elevating table frame removed;

FIG. 20 is a view on an enlarged scale illustrating one of the shiftable roller assemblies of the film loop take-up arrangement of FIG. 17;

FIG. 21 is a fragmentary view, partly in elevation and partly in vertical section of the left hand end portion of the roller assembly of FIG. 20;

FIG. 22 is a fragmentary view partly in elevation and partly in vertical section illustrating portions of two adjacent roller sections;

Figure 27:
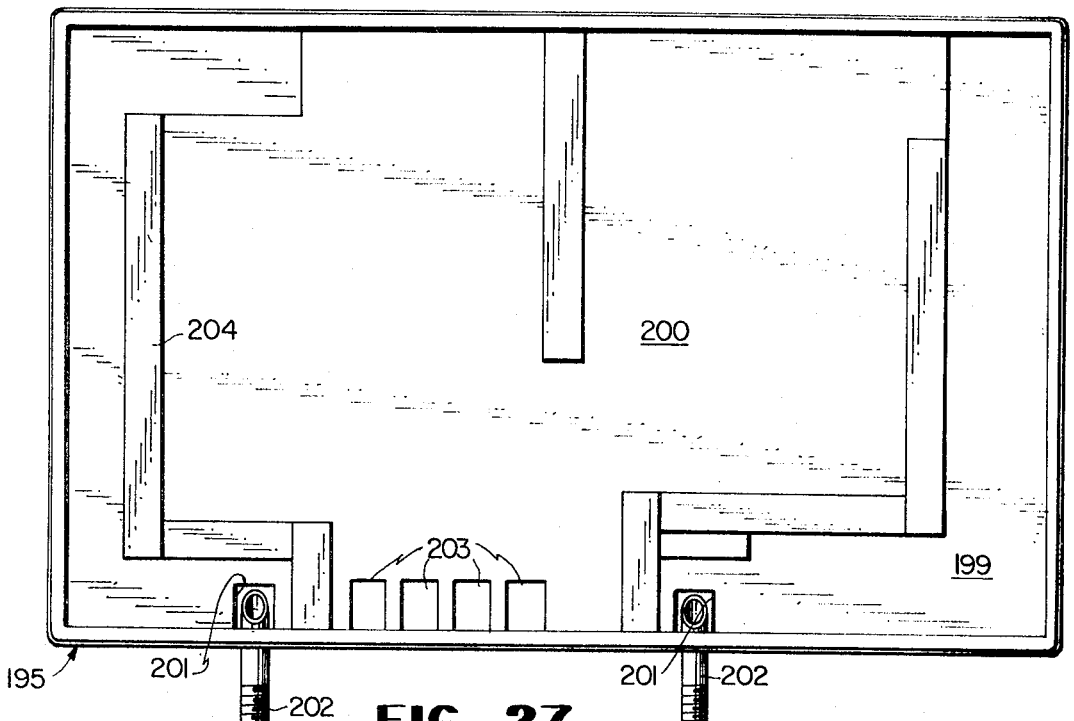
Figure 28:
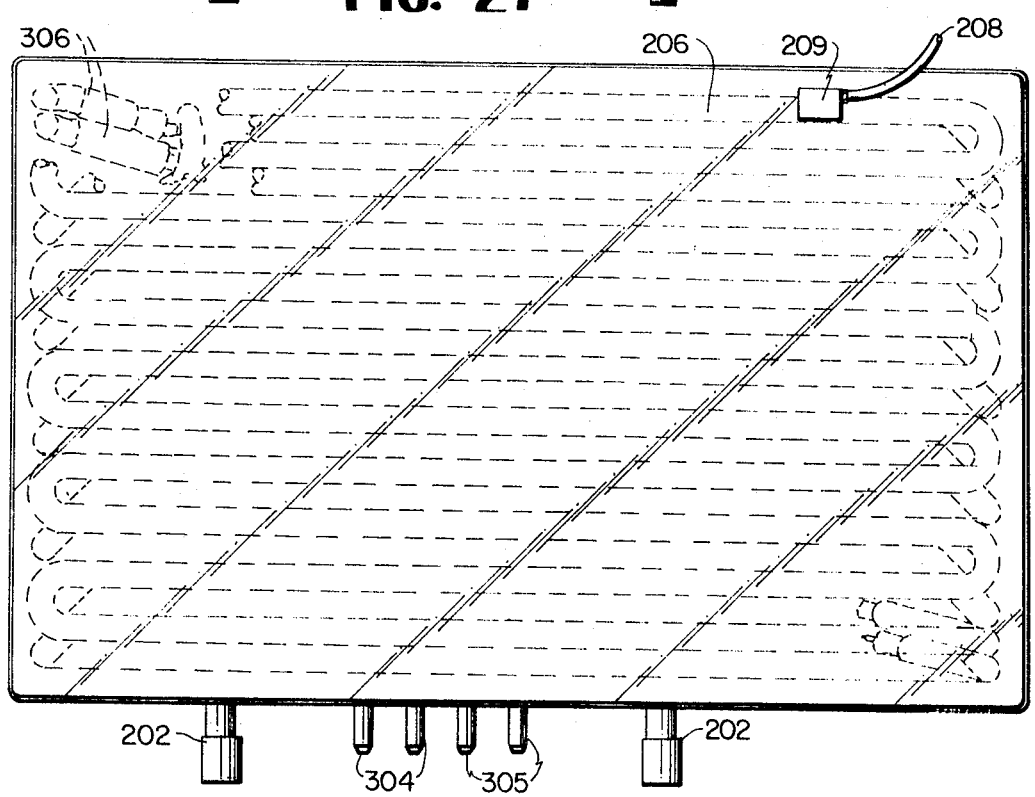
Figure 29:
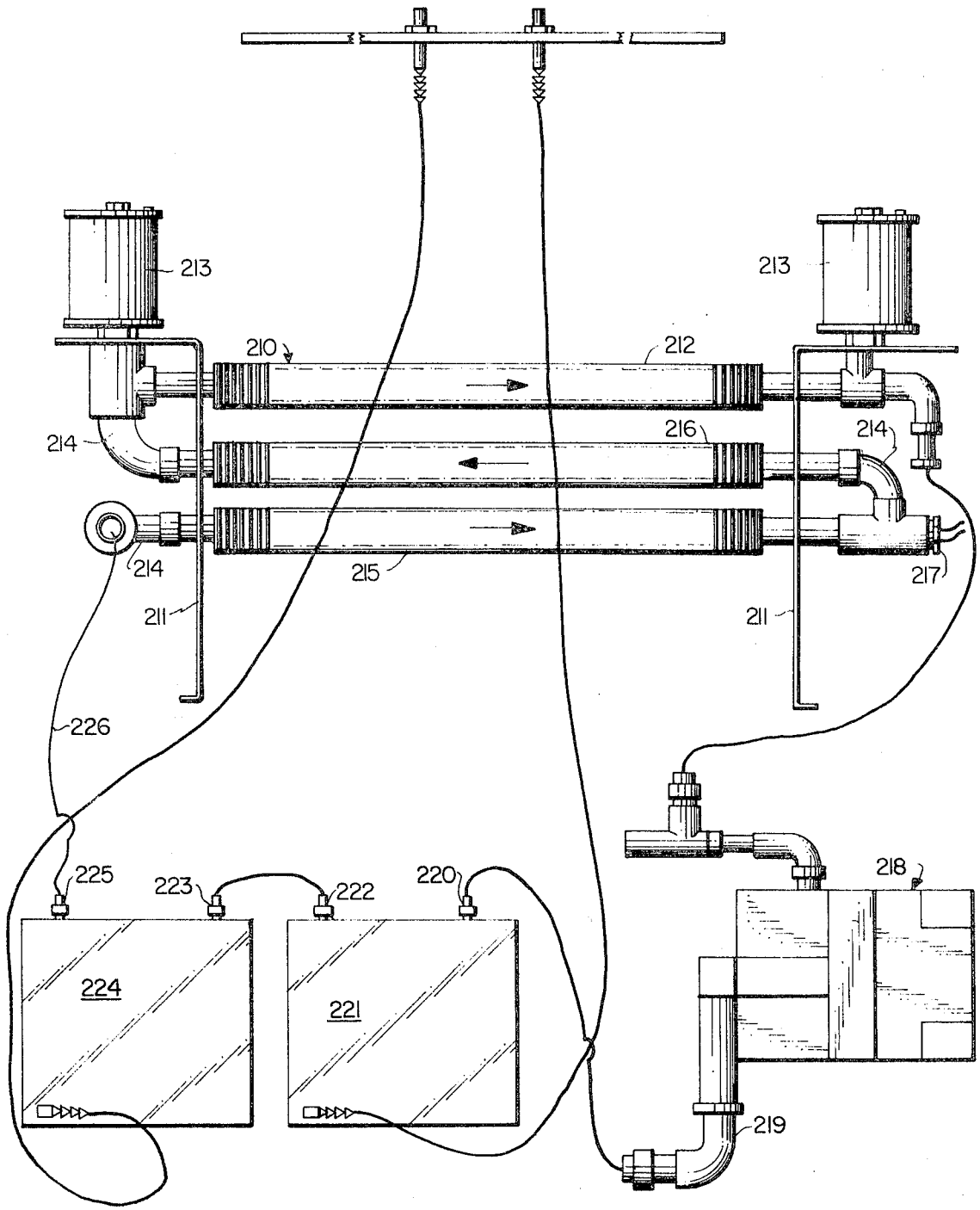

FIGS. 23 to 26 diagrammatically illustrate the various film threading configurations that can be utilized with the film viewer of the invention;

FIG. 27 is a top plan view of the receptacle portion of a light source unit;

FIG. 28 is a top plan view of a light source unit showing the serpentine light tube therein;

FIG. 29 is a view diagrammatically illustrating the light grids and associated oil circulating and heat exchange system;

FIG. 30 is a fragmentary top view illustrating one masking arrangement, and

FIG. 31 illustrates a detail in FIG. 30.

The film viewer of this invention includes a frame that includes spaced uprights 1, a base 2 and caster wheels 3 carried by such base. Toothed racks 4 are mounted on the front faces of the uprights and guide ribs 5 are disposed on the outer faces of the uprights. A film handling table is slidably mounted on the uprights for vertical adjustment. The side walls 6 of this table are provided with vertical spaced pairs of spaced rollers 7 that cooperate with the guide ribs 5 on the uprights. A cross shaft 8 which extends between and has its ends journalled in the side walls 6, carries pinions 9 that engage racks 4. This cross shaft and pinion arrangement in cooperation with a rear brace 10 of the table frame and the cooperation between rollers 7 and ribs 5 ensures stability of and prevents any slewing motions of the table frame relative to the uprights during vertical adjustments. One upright 1 carries a hand wheel 11 for operating a gear drive 12 that rotates a bevel gear 13 on an elevating screw 14 that is engaged in a nut means, not shown, that is carried by the table frame. Thus by turning the hand wheel 11 of drive 12 the table frame and the components carried thereby can be raised or lowered to the height desired by the operator.

Figure 18:
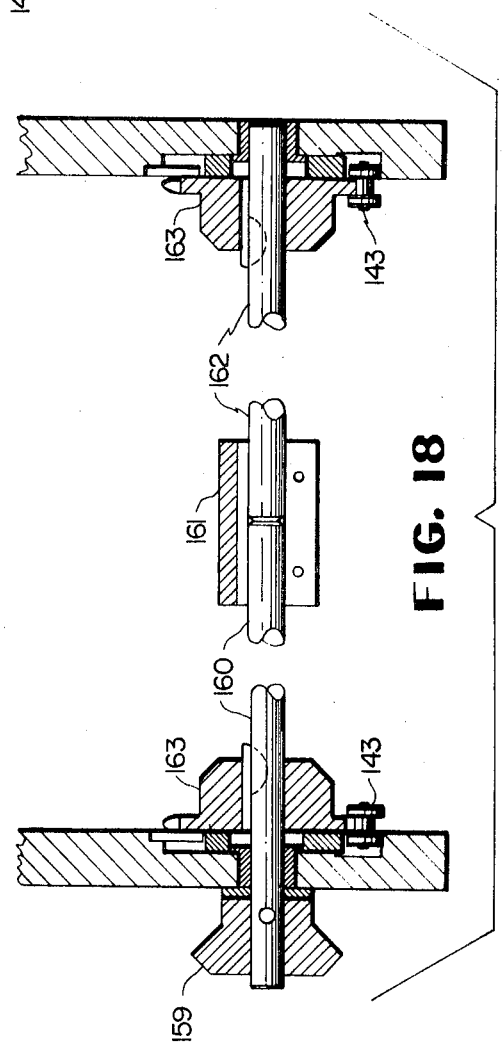
FIG. 18 is a sectional view taken along line 18—18 of FIG. 17.
Figure 19:
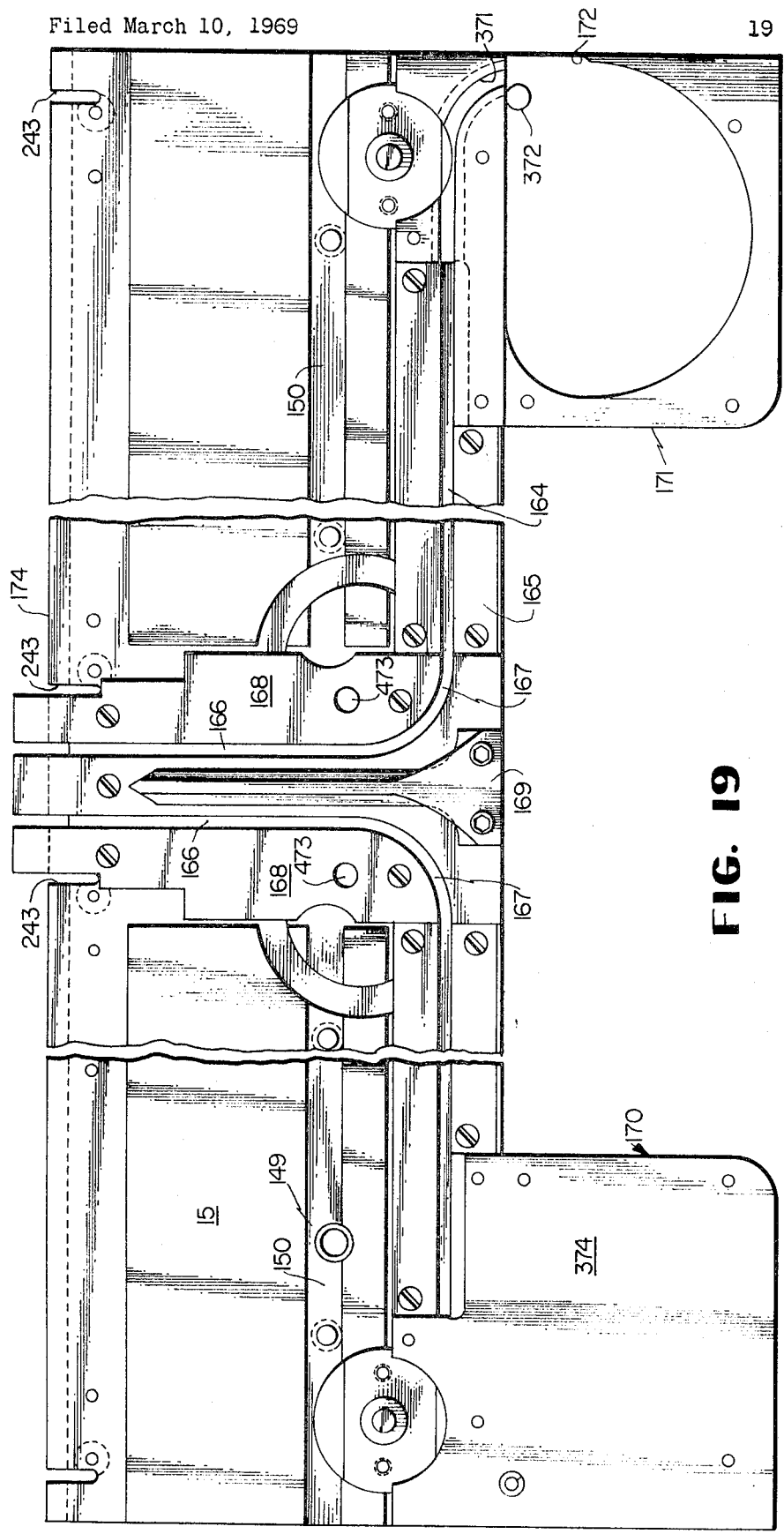
FIG. 19 is a fragmentary front elevational view illustrating the guide track for the shiftable film loop take-up rollers shown in FIG. 17 and the chain magazine for the loop take-up driving chain.
Figure 23:
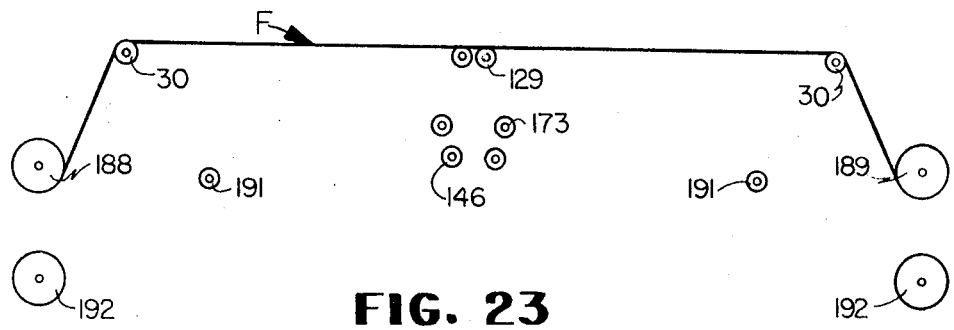
Figure 24:
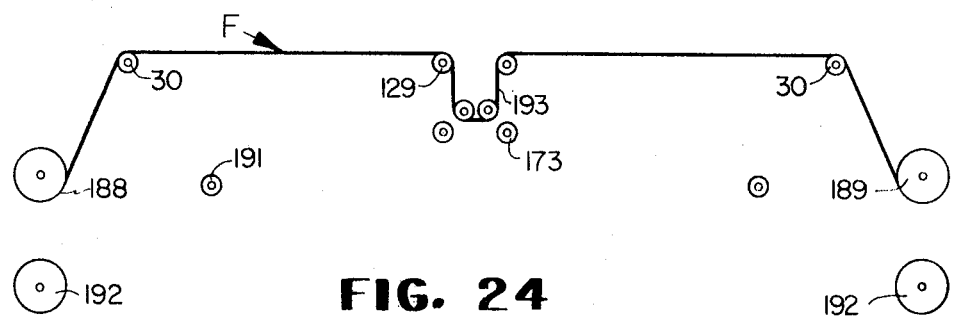
Figure 25:
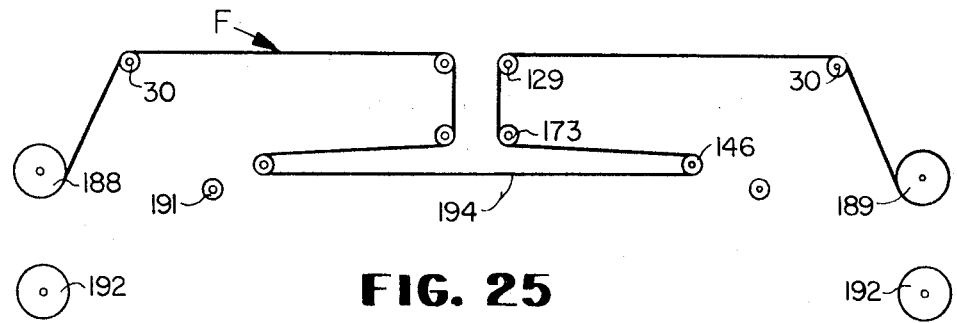

The film handling table is of a robust box frame construction including a front wall structure 15, the side walls 6, a vertically disposed partition 16 dividing the box frame into front and rear compartments. The front compartment is provided with a two part horizontal partition means 17, each of which extends from a side wall toward the center of the compartment but terminate to leave a central gap 18 extending from front to rear of the front compartment, see FIG. 18. The illuminating means comprises a gaseous discharge light source unit described hereinafter, disposed on each part of the partition means 17. The facing inner sides of the front wall 15 and vertical partition 16 are provided with trackways for accommodating the hereinafter described film take-up means, see FIG. 19. The rear compartment is deeper than the front compartment and accommodates electrical circuitry components and suction fans, not shown, an oil circulating and heat exchange system, illustrated in FIG. 29, and some components of a later described film masking arrangement. The heat exchange system is housed in a vertically disposed housing 19 having louvers 20 cut in the back wall thereof so that air drawn into the rear compartment through openings in the bottom thereof by the suction fans associated with openings in the bottom wall of the rear compartment can circulate over the electrical circuitry, the finned tube units of the heat exchanger and out the louvers 20 in the back of the housing 19. The bottom of the front compartment is open but partially covered by a hinged closure plate 21 carrying rollers 191 and held in place by resilient clip members 22 having holes therein engageable over pin means 23 projecting outwardly of the front wall 15.

The top of the front compartment accommodates a two-unit shiftable viewing stage 24 described hereinafter. The adjacent end of each stage unit carries a multi-section roller means 25 and the stage units can be shifted, i.e. moved apart to provide a film handling gap as later described. The film handling means includes side and bottom rails 26 and 27 that accommodate either manual or motorized reel brackets 28, 29 that receive and actuate film reels. Further, film guiding rollers 30 are carried by the sides 6 of the table frame. The various film threading configurations that can be utilized with the structural arrangement of the components of the invention will be more fully explained hereinafter, see FIGS. 23 to 26.

Figure 12:
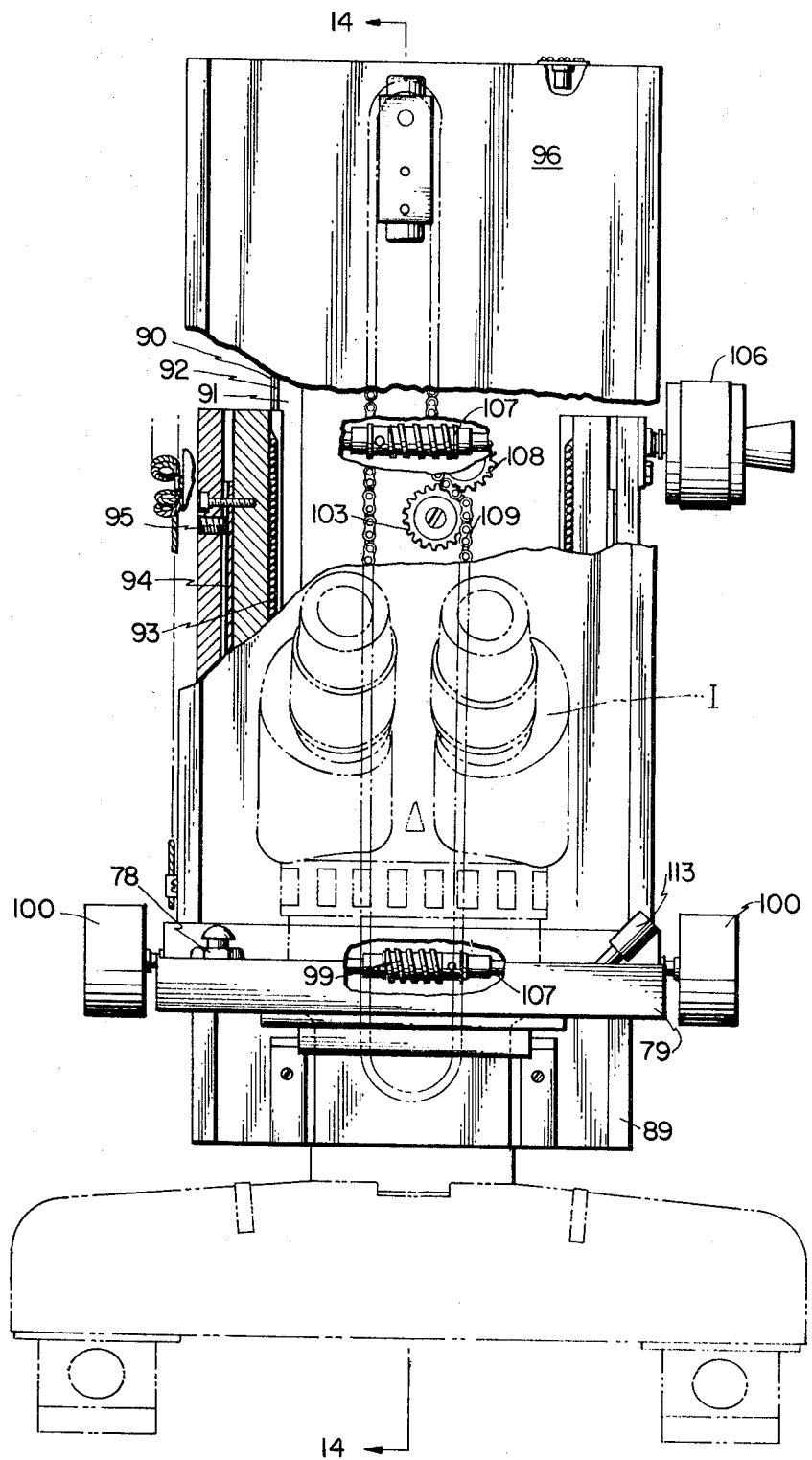
FIG. 12 is a view partly in front elevation, partly in section, and with parts broken away illustrating the Z travel sub assembly and diagrammatically illustrating a viewing instrument.
Figure 13:
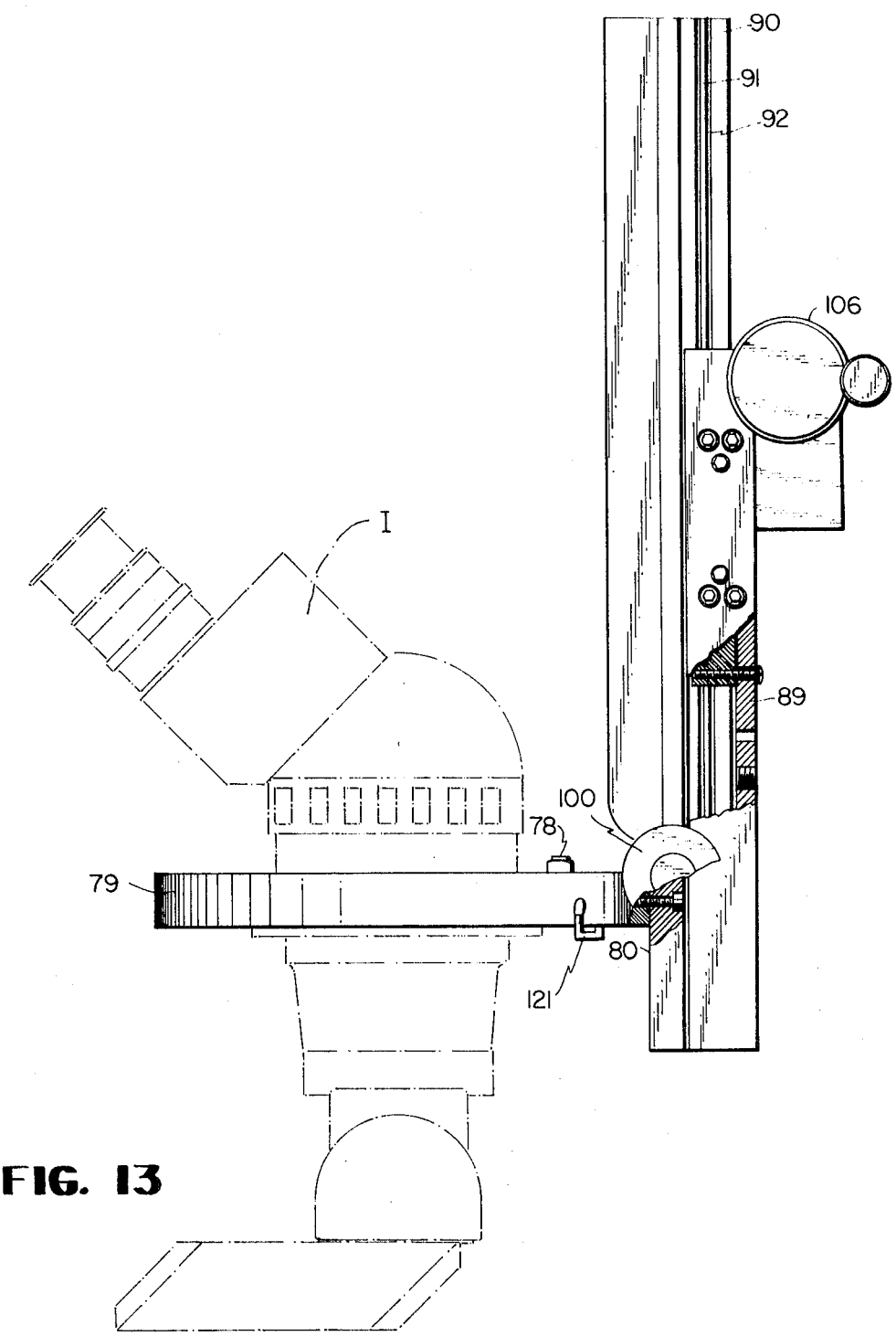
FIG. 13 is a view of the sub assembly shown in FIG. 12 as seen from the right and partially broken away.

The side walls 6 of the table frame include upper portions or arms 31 to which are attached the unit or sub assemblies that constitute the overhead instrument carriage. These units include guide rail or bar means Y travel support and adjusting drive unit C further illustrated in FIGS. 4 and 6, the overhead bridge, instrument X travel support and drive unit D, shown in FIGS. 6 to 10, the instrument support and Z travel and drive and adjustment unit E of FIGS. 12 to 14.

Figure 1:
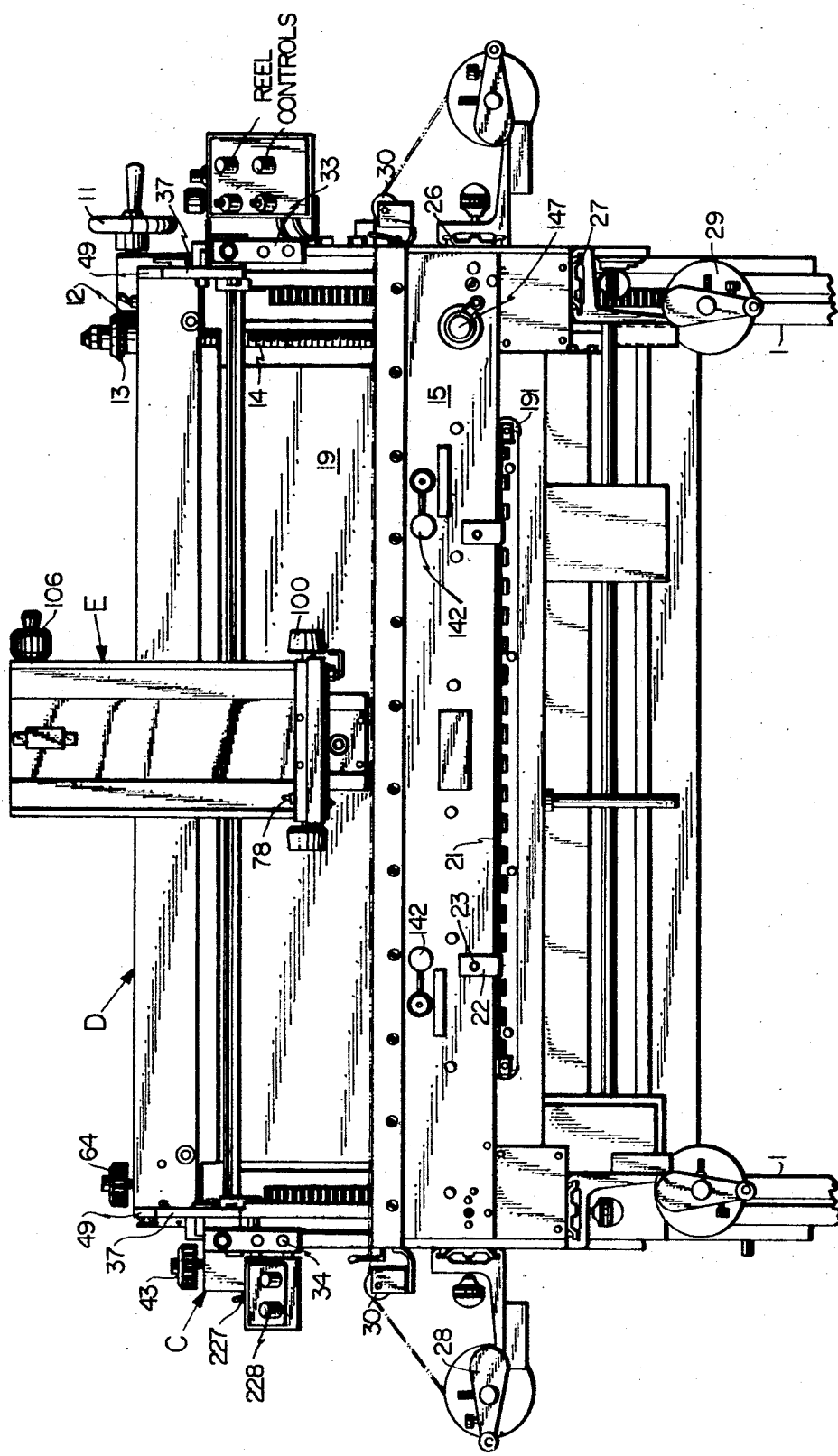
FIG. 1 is a front elevational view of the film viewer of the invention.
Figure 2:
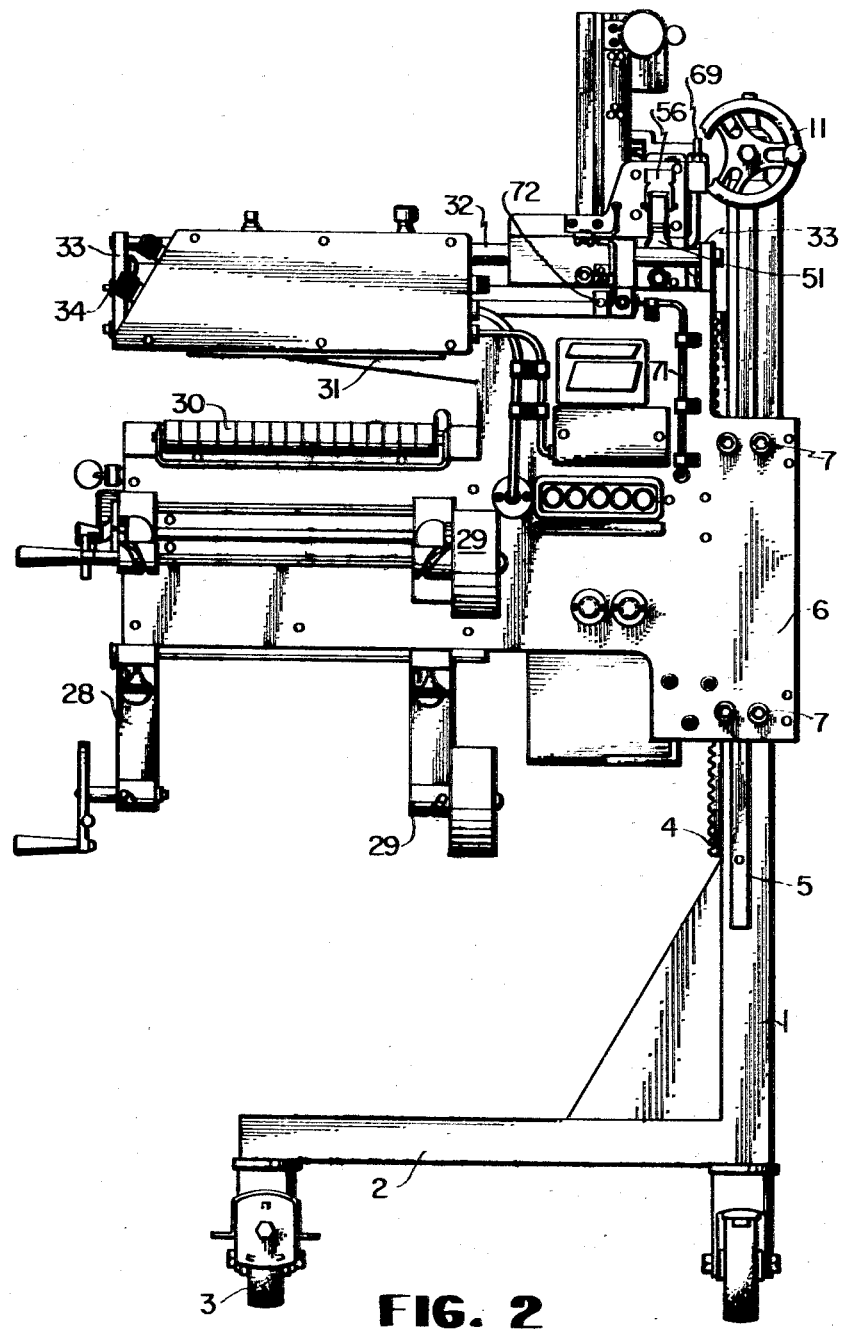
FIG. 2 is a side view of the arrangement of FIG. 1 as seen from the right.
Figure 3:
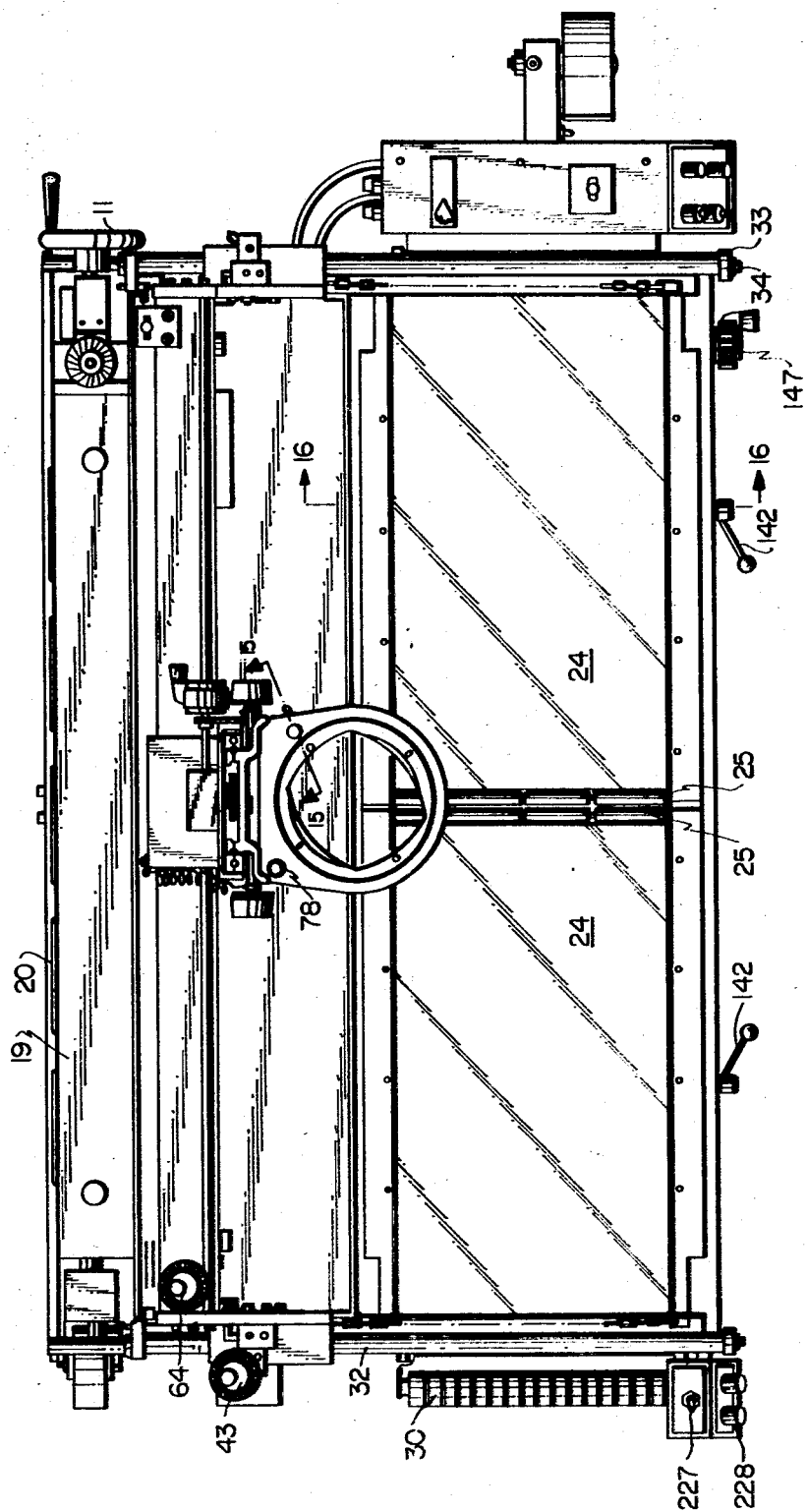
FIG. 3 is a top plan view of the arrangement of FIG. 1
Figure 4:
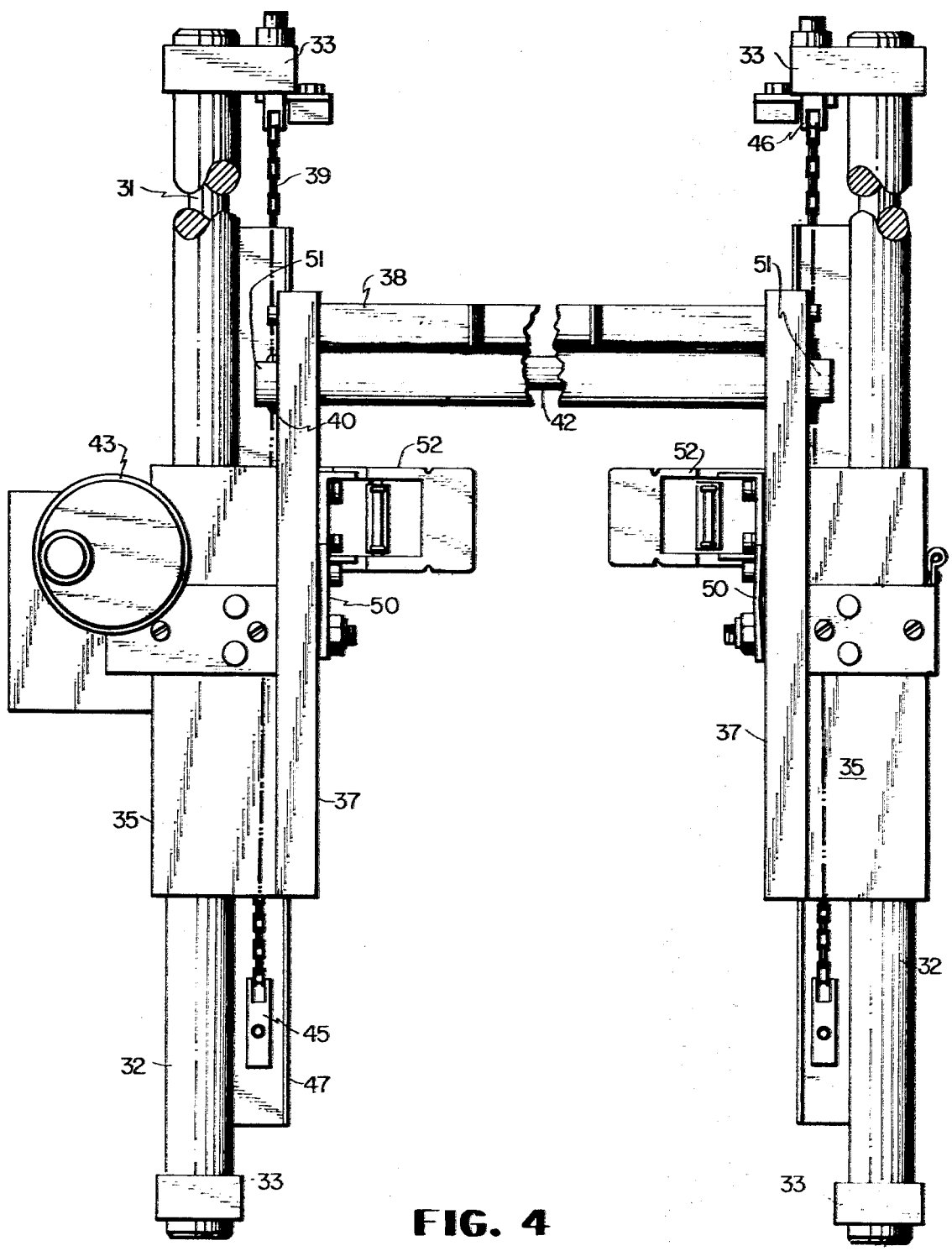
FIG. 4 is a view of the Y travel sub assembly as seen from above and partially broken away.
Figure 5:
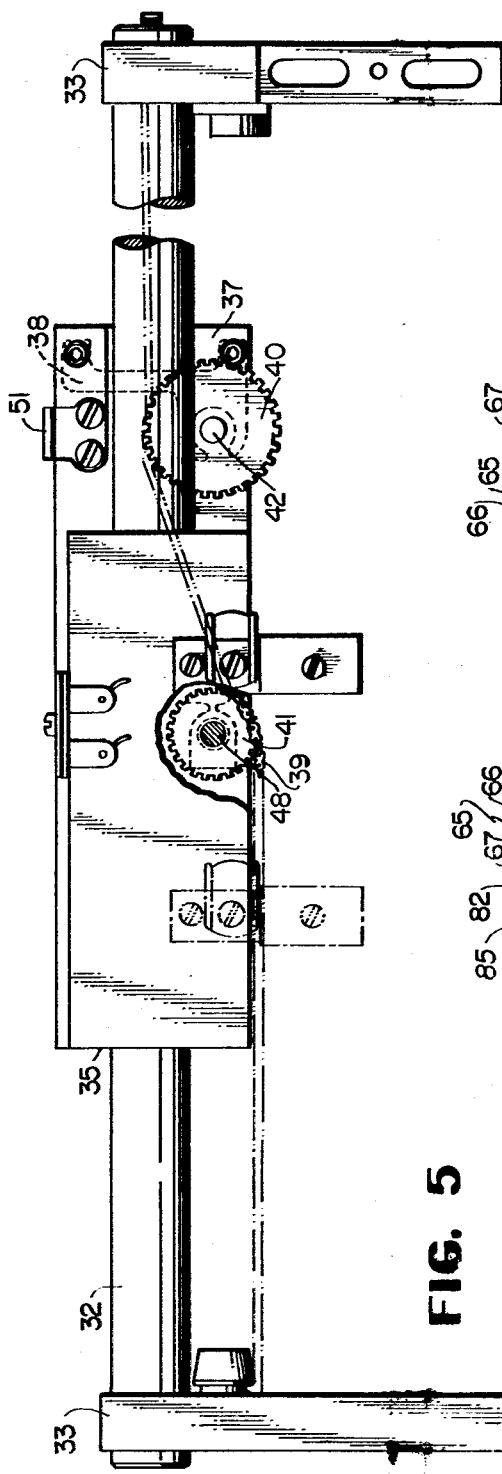
FIG. 5 is a side view of the arrangement of FIG. 4 as seen from the right and partially broken away.

Sub assembly or unit C includes spaced guide bars or rails 32 which are secured in longitudinally spaced supporting legs 33 that are in turn fastened to the arms 31 of the table frame as by bolt or screw means 34, FIGS. 1 to 3. A Y travel carriage means is journalled on the rails 32 and includes opposed housing means 35 carrying axially spaced Thompson ball bushings, the retaining plate for one of same being shown at 36, that engage the rails 32, support plates 37 on the inner side of each housing means 35 and a shaft-accommodating cross brace 38 of extruded aluminum material that helps rigidify the assembly. The drive means for the Y travel of the carriage assembly includes roller chains 39 trained over and under sprockets 40 and 41, FIG. 5. Sprockets 40 are mounted on each end of a cross shaft 42 that is housed within the extruded cross brace 38. One sprocket 41, in the right hand housing of FIGS. 4 and 5 is not driven. The sprocket 41 in the left hand housing is driven by a drive including a hand wheel 43 that turns a shaft 44 which is coupled via an electromagnetic clutch with the shaft carrying the drive sprocket 41. The opposite ends of roller chain members 39 are fastened to chain retainers 45 and 46. The chain retainers 45 are fastened to angle shaped chain support strips 47 that are secured to the inner sides of arms 31. The chain retainers 46 are fastened to the rear rail supporting legs 33. These retainers 46 are at a higher level than retainers 45 since the chains are tangent to the upper side of sprockets 40 and the lower side of sprockets 41. With the electromagnetic clutch energized, the turning of hand wheel 43 drives that sprocket 41 which is associated with the left hand housing means 35. Since the entire assembly is rigidly connected, the Y travel is effected without any backlash or slewing. The drive means is similar to that for effecting the X travel, see FIGS. 12 to 14. However, the shaft 46 turned by hand wheel 43 turns a worm which engages a worm wheel which via the electromagnetic clutch turns another shaft like shaft 48 in the right hand housing 35 that passes beneath the rail 32 and carries the driving sprocket, not shown. The inner wall of the housing means 35 is cut away to provide a clearance space for this driving sprocket and the end of the shaft for this sprocket is journalled in the outer face of the adjacent support plate 37. The housing is not closed at the bottom and at the ends as at 35' to provide a chain accommodating space for the chain.

The upper surfaces of the support plates 37 are level with one another and provide a support for the instrument carrying bridge assembly described hereinafter. Latching and alignment components are carried in part by the plates 37 and in part by the side members 49 of the bridge assembly. Thus a positioning disc 50 is fastened to the inner side of each plate 37 and a catch 51 is fastened to the outer side of each plate 37 at a location above the sprockets 40. On the inner sides of plates 37 are mounted swingable latch members 52 that cooperate with catch members 53 carried by the inner side of side members 49 of the bridge assembly. These catch members 53 are part of a combined catch and aligning member 54. These latter two partial members 53, 54 have facing curved edges to cooperate with the alignment disc 50. As stated, the catch members 53 are located to cooperate with the pivoted latch members 52 and further, pivoted latch members 56 are located on the outer side of the side members 49 for cooperation with the catch members 51 on the outer sides of plates 37. Thus, the bridge assembly can be set down upon plates 37, guided into precise transverse alignment by the cooperation between the arcuate surfaces on the aligning discs with partial members 53 and 54 and securely locked in place by the cooperation betwen the latch and catch members 56, 51 and 52, 53.

Figure 11:
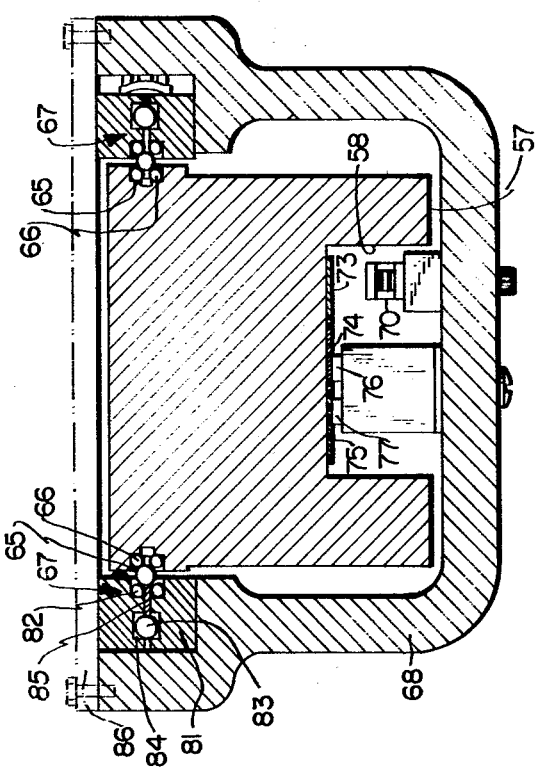
FIG. 11 is a cross-sectional view taken along line 11—11 of FIG. 10.

Extending between the side members 49 is the bridge member proper and rail assembly 57. This rail assembly has an elongated recess or slot 58 in the rear wall. Inside the slot of the rail assembly is a drive roller chain 59 and a drive means including an adjustably fixed idler sprocket 60 and a drive sprocket 61. This sprocket 61 is driven by a worm wheel and electromagnetic clutch assembly 62 from a worm shaft 63 turned by a hand wheel 64. The top and bottom of the rail 57 are each provided with shaped slots 65 and spaced hardened steel rods 66 are at the entrance ends of these slots for cooperation with recirculating ball bearing means 67 carried by a combined bearing housing and Z travel assembly support means 68, FIG. 11. A toggle switch 69 is carried by the rail 57 for controlling the electromagnetic clutches associated with the drive sprocket 61 and the left hand drive sprocket 41 of the Y travel assembly. The means 68 carries on its inner face a support member 70 to which the ends of the drive chain 59 are secured. Thus when the toggle switch 69 is in off position, the Y assembly and the means 68 can be freely moved on their respective support rails in either direction. The toggle switch 69 must be in the on position in order to effect fine adjustments of the Y travel and the means 68 with the hereinafter described Z travel assembly mounted thereon.

The power supply for the electrical clutch coupling arrangement for the X and Y travel arrangements includes a main power input line 71 connected to a bus bar 72 extending along the exterior of the right hand side wall 6 of the table frame. A brush assembly is carried by the housing for the Y travel frame. Power is led from this brush assembly via a lead to one part of a pressure operated switch also carried by the Y travel bearing housing members. The side plates for the X travel bridge or rail assembly carry the matching component of the pressure contact member which when this assembly is latched to the Y travel frame assembly make contact with the contact element carried by that assembly. The lead then extends through the side plate of X travel assembly into the toggle switch casing carried by the rail assembly 57. Three contact bars 73, 74 and 75 are arranged on the rear of the front face of the rail assembly 57. One lead from the toggle switch is connected to the top contact bar 73. A lead from the other end of this contact bar 73 is connected to the electromagnetic clutch 62 carried by the rail assembly. There is a connection from this clutch through another pressure contact arrangement between the opposite side plate 49 of the rail assembly and the other bearing housing 37 for the Y travel frame to the electromagnetic clutch associated with the Y travel drive. The return lead from this second clutch is fed back through the pressure contact arrangement into the rail assembly and connected to the adjacent end of the bottom contact bar 75. Another lead extends between the toggle swich and the end of the middle contact bar 74 adjacent thereto. The X travel housing carries a brush assembly including two brushes 76, 77 which make contact, respectively, with the bottom two contact bars 74 ,75. The leads from these two brushes extend to fixed contact of a normally closed switch controlled by the push button 78 on the forwardly extending porion 79 of the instrument mount Z travel slide 80. The power source is 12 volts and the clutches are series connected 6 volt clutches. The circuitry includes a low voltage transformer. The voltage is rectified by a bridge rectifier and a 1.5 amp fuse protects the circuit. The push button switch being in the return line of the power circuit and when actuated breaks the circuit to declutch or decouple the instrument carrying carriage means for rapid free movement and positioning of the instrument along the X and Y axes. As soon as the push button 78 is released, both electromagnetic clutches are energized to effect automatic coupling of both X and Y fine feed. When the toggle switch 69 is in off position, free movement along the X and Y axes is permitted.

It is to be understood that the hand wheel control drives for the X and Y feeds can be replaced by electric motor drives. To control such a motorized feed arrangement, a joy stick type switch is included in the motor control circuits.

In this arrangement, one motorized drive feeds the instrument from left to right and vice versa on the overhead bridge (X travel) and the other motorized drive feeds the bridge and thus the instrument toward and away from the operation (Y travel). There are four fixed contacts arranged in equi-spaced relation around a ball joint joy stick type movable contact that has a vertical neutral position and can be moved into eight positions to effect the following movements of the instrument carriage system:

(1) Pulling the joy stick from neutral toward the operator effects feed in the Y direction toward the operator.

(2) Pushing the joy stick from neutral away from the operator effects feed in the Y direction away from the operator.

(3) Moving the joy stick from neutral to the right effects feed in the X direction from left to right.

(4) Moving the joy stick from neutral to the left effects feed in the X direction from right to left.

(5) Pulling the joy stick from neutral at a 45° angle toward the operator and to the right of neutral effects combined feed toward the operator in the Y direction and to the right in the X direction.

(6) Pushing the joy stick from neutral at a 45° angle away from the operator and to the right of neutral effects combined feed away from the operator in the Y direction and to the right in the X direction.

(7) Pulling the joy stick from neutral at a 45° angle toward the operator and to the left of neutral effects combined feed toward the operator in the Y direction and to the left in the X direction.

(8) Pushing the joy stick from neutral at a 45° angle away from the operator and to the left of neutral effects combined feed away from the operator in the Y direction and to the left in the X direction.

The recirculating ball bearing means 67 carried by combined means 68 includes upper and lower bearing assemblies, each comprising spaced shaped plates 81 which when joined in facing relation, accommodate a pair of hardened steel load bearing rods 82, a ball return guiding steel pin, not shown, having reduced and tapered ends for ball circulation, a series of ball members 83 and a return slot 84 for these members. A ball retaining plate 85 is fit between the two shaped plates. Ball bearing means 67 are accommodated within the shaped slots 65 on the rail 57 and a support plate 86 shown diagrammatically in FIG. 8 can be fastened to the open front of combined means 68 via threaded holes 87. This plate, if used, is provided with threaded holes 88 to receive fastening screws that secure the guide 89 of the Z travel assembly unit E to the combined bearing housing and Z travel assembly support means 68.

The Z travel support unit, FIGS. 12 to 15, includes the guide 89 having laterally spaced parallel ways 90 each having shaped slots 91, and hardened steel rods 92 carried at the entrance end of such slots. The instrument supporting slide 80 is provided with laterally spaced recirculating ball bearing assembly means 93, similar to the assembly means 67 so that the slide 80 can readily move up and down. One of these bearing assemblies is pre-loaded via a slight V-section pressure plate 94 and adjusting screw 95. The slide 80 is provided with the forwardly extending instrument supporting base 79 described in more detail hereinafter. The drive means for Z travel adjustment is a gravity controlled chain drive arrangement carried in part by the slide 80 and in part by the guide 89 which includes an upper sprocket 95 mounted on the rear of slide plate 96 and a lower slide-carried fine adjustment drive means including sprocket 97 driven by a worm gear 98 turned by a worm shaft 99 and controlled by fine adjustment hand wheels 100. The guide 89 has a drive housing 101 mounted on its rear face. A drive shaft 102 extends through this housing and a bore through the guide. A drive sprocket 103 is mounted on the projecting portion of shaft 102. A worm wheel 104 is journalled on shaft 102 and a one way over-running clutch means 105 connects this worm wheel 104 to shaft 102. A coarse feed adjustment hand wheel 106 is secured to worm shaft 107 for turning worm wheel 104 and through clutch means 105, the shaft 102 and sprocket 103.

An idler sprocket 108 is carried by the front of the guide 89 at a location above and laterally offset from sprocket 103. Endless roller or pin type chain 109 is trained around upper sprocket 95 between sprockets 108 and 103 and around sprocket 97. Thus the slide 80 is suspended by the chain portion passing between sprockets 108 and 103 as if it were rope supported. The slide can be freely moved upwards. However, it must be allowed to feed down by gravity in response to turning of either hand wheel 106 for coarse adjustment or hand wheel 100 for fine adjustment. The clutch means 105 is such that if the instrument I, FIGS. 12 and 13, meets an obstruction that may be on the viewing stage, the clutch overruns shaft 102 so that the slide can no longer feed downwardly.

The forwardly extending supporting portion or base 79 carries a rotary instrument supporting rnig 110 journalled by ball bearing means 111. This ring has a shaped opening with suitably shaped recesses such as at 112, FIG. 3, to accommodate a flange on any one of the instruments noted in this specification. Set screws such as at 113 secure the instrument on the ring. In order to lock this ring and the instrument carried thereby in a selected position of adjustment around the Z axis, a novel lock or clamp means is provided which is operative to hold the rotary ring 110 in adjusted position without applying any direct force to the ring in a vertical direction so as not to disturb the Z axis of the instrument. This lock or clamp means includes a stainless steel brake ring or disc 114 secured to the outer face of a ring bearing takeup ring 115. Screw means 116 secure the rings 114 and 115 to the underside of rotary ring 110. The brake ring 114 is spaced below the under surfaces of base 79 as shown in FIG. 14. The base 79 has a shaped vertically extending bore 116 extending therethrough. Slidably fit within this bore is a C-shaped locking block 117. The block is positioned so that the opening 118 therein faces and straddles the ring 114. Secured to the under side of base 79 are angled tabs of an offset brass clamping strip 119 that includes a portion passing through the opening 118 beneath brake ring 114. The lower leg of C-block 117 is tapped vertically to receive the threaded end 120 of an angle shaped pressure applying set screw and handle member 121. The upper leg of the C-block is tapped vertically to receive a positioning screw and a retaining screw. The C-block 117 is square in horizontal cross-section and the bore 116 is a square bore with arcuate grooves along the mid-portion of each side so that some of the spring fingers of a round cap 122 can fit in such grooves. Since the block 117 is vertically slidable in the bore 116, it is held in place by the engagement of ring 114 beneath the positioning screw. In other words the weight of the block is borne by the brake ring. The threaded relation of the screw and of member 121 is such that a quarter turn of the lever applies the screw end against the under surface of brass strip 119 to apply same against the under surface of ring 114 to clamp this ring between the brass strip and the end of positioning screw or the under surface of the upper leg of the C-block, as the case may be. This locks the rotary instrument carrying ring 110 in adjusted position. When the handle is reversely turned the rotary ring 110 can be turned to rotatably adjust the position of the instrument about the Z axis.

The viewing stage assembly, see FIGS. 3 and 6, includes a pair of stage units 123 and 124. Each unit includes an outer extruded frame 125 that is U-shaped in plan. The under surface of each frame is provided with a pair of shaped, depending peripheral flange means 126 and 127 that fit over a reduced extension 128 of the front wall 15 and the vertical partition 16 so that the stage units can slide relative to the box frame. The legs of each U-shaped frame are exended beyond the stage proper to accommodate a multi-section roller means 129. An inner frame 130 is connected to each frame 125 and includes an outer securing flange 131 and vertically spaced inwardly extending flanges 132 and 133. A sponge rubber strip 134 is disposed between the securing flange 131 and the under surface of frame 125 and fastening screws 334 secure the frames 125 and 130 together. The sponge rubber strip permits leveling of the viewing stages. A plastic diffusion plate 135 is replaceably secured between flanges 132 and 133, and a glass plate 136 is secured in place on flange 132. A stage shifter means is associated with the front leg of each frame 125. Each stage shifter includes a plate 137 secured to the inner face of the inner depending flange 127 of the frame 125. Each plate 137 is provided with an offset portion having a vertically displaced slot 138 extending up from its bottom edge. A pin 139 carried eccentrically of a bar 140 is engaged in the slot 138. The bars 140 are each secured to the notched end of a shaft means 141 journalled in an opening in the front wall 15 of the box frame and turnable by a handle 142. The shifting of each bar is limited by limit pins, not shown. The arrangement is such that each stage can be moved back from the position of FIG. 3 which is for conventional film threading, a distance of about 5/8" to 3/4" to expose a space between the stages for accommodating a film take-up or loop control means or to permit what is termed a split-vertical film threading configuration.

As is clear from FIGS. 1 and 3, there are no components that project above the level of the viewing stage. Thus the operator has no obstructions during the use of the viewer.

The film loop control of the invention, FIGS. 17 to 26, is compact and capable of either long or short take-up for forming and controlling a variable size loop in the film so that two pictures of the same object on an aerial film which may be separated by a considerable distance on the film may be placed side by side for comparison purposes in a stereo study of the film. Prior art arrangements for such film type loop control embody components that project above the level of the viewing stage and further include more complex drive means for effecting film control.

According to the invention, the rear of the front wall 15 and the front of the vertical partition 16 are each provided with track means that accommodate two pairs of link and pin or roller type chain lengths 143.

The facing side links at one end of each pair of chain lengths are each provided with two pins 144 that fit into two holes on each end of a roller support bar 145. A multisection roller 146 is mounted on each bar 145 of less thickness than the diameter of the associated roller assembly. Each chain of each pair is associated with a chain magazine and a track. To drive the chains, the hand wheel 147 is turned to rotate shaft 148 that extends through a bronze flanged bearing 149, FIG. 19, that is provided in the front plate 15 and a similar and aligned bearing in the rear plate or partition 16. Each side of each overlying horizontal partition member 17 is accommodated in a groove 150 milled in the rear face of the front wall 15 and front face of the vertical partition 16, see FIG. 17. The under surface of this partition is grooved transversely at 151 to accommodate shaft 148. The projecting end of this shaft 148 carries a worm 152 engaging a worm wheel 153 on a shaft section 154. Shaft section 154 is connected via an adjusting coupling 155 to a shaft section 156. Bearing brackets 157 support these shaft sections. The outer ends of shaft sections 154 and 156 carry bevel gears 158 that mesh with bevel gears 159 on the outer ends of shaft sections 160. These latter sections are coupled via further adjusting couplings 161 to shaft sections 162. Each shaft section 160 and 162 carries a sprocket 163 that meshes with a pin or roller chain length 143.

Each chain length 143 is associated with a track formed in the walls. The back of the front plate 5 and the facing surface of the vertical partition 16 or back plate for the front table compartment are milled to provide horizontal groove portions 164 that are partially covered by Tufram coated plates 165 and vertical groove portions 166 connected to the horizontal groove portions by a curved groove portion 167. These groove portions are partially covered by plates 168. A shaped guide member 169 is provided between vertical groove portion 166 for guiding and spacing the roller carrying bars 145. The outer side links of the pin or roller chain 143 are accommodated in the grooves 164, 166 in the plates; the pin portions of the chain lengths 143 riding on the facing edges of the plates 165, 168 that partially cover the grooves, see FIG. 16. At each end of each horizontal groove portion is a chain magazine 170 formed by two milled plates 171 that fit over the milled reduced thickness portions of the ends of the main box frame plates to provide chain accommodating spaces and milled tracks including downturned end portions 371. A pin 372 is disposed adjacent track ends 371 to prevent chain kinking. A removable cover plate 374 closes each magazine. These magazines 170 are open as at 172 at the sides of the frame to facilitate feeding of the chain lengths into the magazine and beneath the drive sprockets 163. Fixed multi-sectioned rollers 173, FIG. 17, are mounted between the front and back plates in holes 473 FIG. 19, for guiding film strip during loop forming or split vertical viewing of two film strips. The plates 168 that partially cover the vertical grooves extend above the upper edge 174 of the front and back plates and the gaps between these plates are covered by angle shaped trim plates 175, FIGS. 1, 3 and 16.

The trim plates 175 are put in place after the chain lengths 143 have been fed down the vertical grooves along the tracks into the magazine and the roller assembly support bars 145 connected to the chains. The trim plates 175, when in place, prevent the film take-up roller support bars 145 from extending above the level of the viewing stage units but allows the roller assemblies carried by such support bars to project above the glass top of the viewing stage units to permit manipulation of such roller assemblies to allow the passage of film thereunder during film loop take-up adjustments. The chain shifted roller assemblies 146 are mounted on supporting ball screws 178 fastened to the support bar 145.

Each roller assembly 146 is a retractable multisectioned roller and includes a main support bar 179 on which are mounted roller sleeves 180 via ball bearing means 181. These roller sleeves 180 are independently rotatable and of different lengths so as to cooperate with different film strip widths. At one end of support bar 179 a shell 181 is secured and which shell has an opening in the bottom thereof which fits over the ball end of the associated ball screw 178. This opening is such that by shifting the roller assembly to the right, FIG. 20, it can be lifted off the ball screw. Further the shell is such that the roller assembly can universally pivot around the ball end of the screw. The other end of support bar 179 is tapped longitudinally to accommodate a headed screw 182. The adjacent end of roller sleeve 180 accommodates a ball bearing means 183, a flat washer 184 and a sleeve 185 having a threaded end that engages threads on screw 182. A compression spring 186 fits around sleeve 185 and is biased between the washer 184 and a shell 187. This shell has a cut-out end that fits over the ball end of the adjacent ball screw. The headed end of screw 182 bears against the outer end of sleeve 185 and the base of shell 187. Thus when the shell 187 is pushed inwards, spring 186 compresses and the shell can move off of the ball end of the ball screw so that the roller assembly 146 can freely swing upwards and laterally about the ball end of the other ball screw on the roller asembly support bar 145.

The various film threading configurations that can be used with this invention include a conventional straight line film feed which comprises feeding film F from the left-hand reel assembly 188, over the roller means 30 carried by the left side of the table, across the viewing stage with the two stage parts closed, over the roller means 30 on the right hand side of the table to the take-up reel assembly 189. During this film feeding arrangement, the film take-up means remain in a lowered condition.

Figure 26:
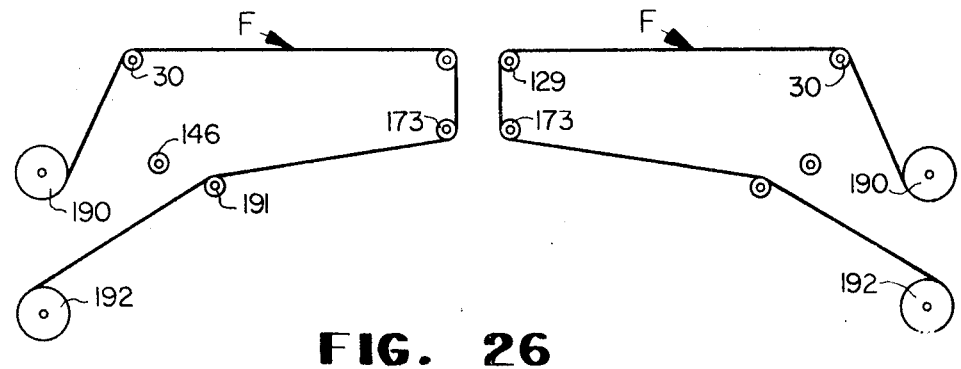

For what is termed split-vertical threading, FIG. 26, a supply reel 190 is mounted on the respective upper-most right and left hand reel mounts 26, and the stage is shifted to open position. The film take-up roller assemblies 146 are retracted to lie close to their respective magazines. The bottom closure 21 is opened and the film F is passed from each supply reel 190 over the roller means 30 carried by the sides of the table across the stage units, around the rollers 129 carried by the ends thereof down through the table, around the rollers 173 carried between the front and back walls 15,16 of the front compartment, through the opening in the bottom back to the lower film take-up reel assemblies 192. The hinged closure plate 21 is closed to bring rollers 191 into position.

To effect a short loop take-up, the bottom is closed. The stage units 123,124 are shifted apart and the film take-up actuating hand wheel 147 is turned to the left to drive the chain lengths 143 and the roller assembly support bars 145 along the horizontal trackway portions, and up the vertical portions until the roller support bars abut the trim plates 175.

Then the movable shells 187 are pushed inwards, the roller assemblies 146 lifted and are swung back to extend transversely of the table top. The film F which has been threaded straight across the table now includes a portion over the gap between the stage units. The roller assemblies 146 are then swung back to be connected to their associated support bars. Following this manipulation, the hand wheel 147 is turned to the right to draw the chain assemblies 143 back down the vertical track portions to lower the roller support bars to draw the film down into a short loop 193.

If long loop take-up is needed, the turning of the hand wheel is continued until the film F forms an inverted T-loop 194 as shown.

While the illustrated arrangement embodies manual operation of the drive for the film loop take-up means, it is to be understood that electric motor drive means and appropriate controls therefor can be embodied with the driving components, if desired.

In any event, the invention provides film loop take-up means which does not incorporate any structure that projects above the viewing level or stage top during loop forming.

Figure 16:
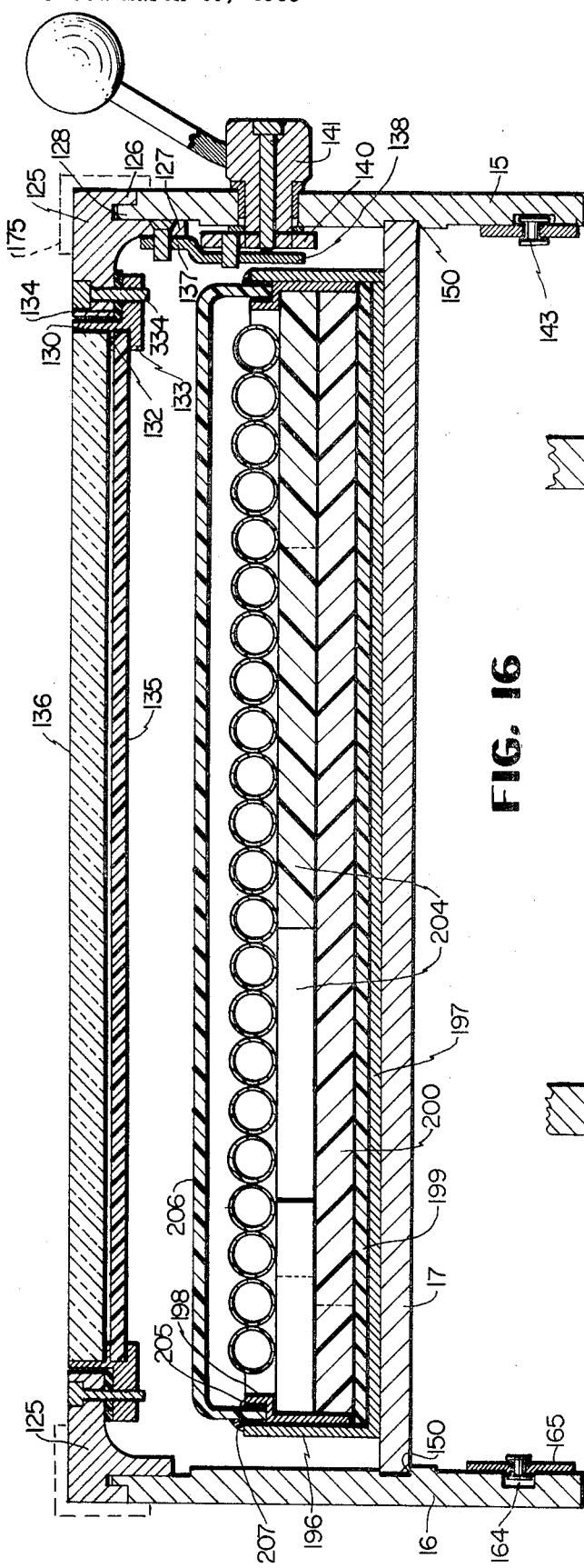
FIG. 16 is a vertical cross sectional view taken along line 16—16 of FIG. 3 and illustrating details of the viewing stage, table frame, and light source construction.

The light source for the viewer comprises a pair of cold cathode argon mercury gas filled light grids of serpentine configuration. Two light units are used, one supported on each of the horizontal partition members 17. Each light unit includes a receptacle 195 having side walls 196 and a bottom 197. An angle shaped strip 198 extends around the interior of the side walls to cooperate with the same to provide a channel. The bottom or base of the receptable is provided with a layer 199 of shock absorbing reflective material of about ⅛″ thickness. This material is expanded beaded polystyrene. On the top of this layer is cemented a ½″ thick flat layer 200 of the same material. This layer is provided with cutouts 201 and 203 to accommodate two conduit sections 202 and thermostats and leads 304, 305 for each of two serpentine light tubes 306, respectively. On the top of this intermediate layer 200 of combined reflecting and shock absorbing material are cemented a plurality of ½″ thick strips 204 arranged in a pattern so as to, together with the shaped peripheral edges of the underlying layer 200, define a tortuous path from one conduit section to the other. The two serpentine light tubes 306 are interleaved or intermeshed so that the respective straight lengths of one tube fit in the spaces between the straight lengths of the other tube. In other words one light tube has its bends on the same level whereas the bends of the other light tube extend down and up so that the major area of the two intermeshed light tubes are on the same level. Once the two light tubes 306 have fit together in this fashion, strips of a potting compound, not shown, are applied from front to back on the undersurface of the assembled tubes to flow partially up into the narrow space between adjacent tube lengths and thus cement the two tube lengths together to provide a single double tube unit. Thereafter a strip of cement is placed along the upper surfaces of the two outermost and parallel strips 204 and the assembled double tube unit with its appropriate electrical leads is cemented in place. The thermostats and electrical leads are passed out through the side wall of the receptacle via the cutouts 203 in the first thick layer 200 of shock absorbing and light reflecting material. The openings in the side wall are sealed around the electrical lead and thermostat means that project externally of the receptacle between the conduit lengths. Thereafter the channel at the upper end of the rim is provided with a filling of cement 205 and a plexiglass dome 206 having downturned edges that fit within the channel is cemented in place. Further a sealing compound 207 of epoxy material is provided in the channel externally of the rim of the dome to completely seal the interior of the light unit. A polyurethane tubing 208 is coupled to a fitting 209 that is sealed about a hole in the top of the plexiglass dome to provide an expansion chamber and to permit evacuation of the interior of the sealed lamp unit as described hereinafter. It is to be pointed out and as shown in FIG. 16, the upper surface of the plexiglass dome is inclined slightly downwards from front to rear and the tubing-accommodating fitting is associated with the front portion of the dome where the space between the upper surface of the light tube unit and the undersurface of the dome top is greatest.

As stated two enclosed light units are used and FIG. 29 diagrammatically illustrates a very important aspect of this invention. This contemplates the protection and cooling of the lamp grids through encapsulation and oil immersion. Thus the invention further includes a heat exchanger 210 of finned tube construction embodying three finned tube units carried by brackets 211 that fit within the upstanding casing at the back of the rear compartment. Associated with each end of the uppermost finned tube unit 212 exteriorally of the brackets, is a pair of vertically positioned combined overflow reservoir and filler receptacles 213. Pipe or conduit sections 214 connect the finned tube units together and the pipe sections are so arranged that fluid can flow into the left hand end of the lower finned tube unit 215 out the opposite end and up into the right end of the intermediate unit 216 and then out the other end of that unit and into and through the uppermost unit 212. An electric heating unit 217 is associated with the pipe fitting between the outlet of the lower unit and the inlet of the intermediate unit. The outlet from the uppermost finned tube unit 212 is connected by a length of piping or tubing to the intake side of a diagrammatically illustrated electric motor operated pump unit 218, the outlet fitting 219 of which is connected via a length of piping to the right hand conduit section or hose fitting 220 associated with the right hand lamp or light unit 221. The left hand conduit section 222 of that lamp unit 221 is connected by a length of piping to the right hand conduit 223 section of the left hand lamp unit 224. The other conduit section 225 of that lamp unit is connected via a length of piping or tubing 226 to the pipe section 214 leading into the left hand end of the lower heat exchange tube unit. The entire fluid flow system thus described including the encased light units is filled completely with a highly refined mineral oil (pure paraffin) of extreme clarity and high dielectric strength.

The lamps or light tube units are fed from a 9000 volt source and in order to obtain the optimum light intensity from the low pressure bright light source, the invention contemplates circulating the oil through the lamp grids during operation. Any entrapped air is bled off through the tubing lengths associated with the tops of the domes of the grid units. The concept of the invention is predicated upon the fact that the light intensity output diminishes after the temperature of the lamp has reached a particular degree. In other words the light intensity curve is a knee curve with the intensity increasing as the temperature increases until at approximately 140° F. the peak of the curve is reached. Thereafter if the temperature increases, the light intensity decreases and prolonged operation at such increased temperatures damages the lamp. Further, it is desirable to have the lamp reach an optimum operating temperature as rapidly as possible. Thus this invention in use, provides an arrangement in which when starting a film viewing operation, a toggle switch 227 is moved to on position, the light source control knob or knobs 228 are turned on and the oil circulating pump is energized. The toggle switch 227 turns on the electric heating unit 217 in the oil flow path so that the oil temperature is rapidly increased to bring the same up to a level such that the lamp temperature is about 135° F. The thermostat controls are so related with the electrical circuitry that the circulating oil bath flowing over the lamp grids maintains the lamp temperatures at about 135° F. This relationship enables the lamp system to be operated at optimum or light intensity over a prolonged period of time without damaging the lamp. This system further provides that the temperature of the stage does not exceed 105° F.

The strips 204 immediately beneath the lamp grids do establish a tortuous flow through each lamp unit even though there might be some spillage effect across the tops of the lamp grids because the conduit fittings are associated with the lamp grid receptable at the bottom thereof.

In some instances, it is desirable to be able to mask some or all of the film strip being viewed. Thus a masking arrangement 229 is provided which is illustrated in FIGS. 30 and 31. Only one masking arrangement is shown which is positioned to extend across the top of the light unit beneath left hand stage 123, it being understood that another masking arrangement is associated with the other light unit beneath the other stage 124.

Each masking arrangement includes a masking shade such as an opaque vinyl covered nylon shade 230 carried by a roller 231 that is mounted on brackets 232 fixed to the vertical partition 16 on the box frame. The shaft roller 231 carries a drum 234 at one end thereof. One end of a cable 235 is fastened to this drum, wound therearound and then passed to a spring controlled wind-up drum 236 carried by bracket means 237 secured to the interior of one side wall 6 of the table frame. The free end of the masking shade is connected to a cross bar 238 having a handle 239 at one end. Spaced pairs of grooved rollers or pulleys 240, are mounted on this cross bar adjacent each side edge of the masking shade. A shade guide arrangement is provided which includes two cable means 241, 242. One cable means 241 is dead ended at the front wall of the table frame, extends through a slot 243 in this wall, passes over the lower left hand side roller 244, across the under side of the cross bar 238, under the upper or diagonally opposite right hand side roller 245 then back to and around a stationary guide roller 246 through a guide 247 to one end of a tension spring 248. A length of cable 249 extends from the other end of the tension spring 248 to a take-up or tension adjustor means 250. The other cable means 242 is dead ended at the front wall 15 of the box frame, extends through another slot 243, passes back and over the lower right hand side roller 251, across the underside of the cross bar 238, crossing the other cable 241 then around the upper or diagonally opposite left hand side roller 252, then back above the drum 234 and then around a bracket carried guide roller 253 to one end of another tension spring 254. Another cable length 255 extends from the other end of this spring to the tension adjusting means 250.

It is thus clear that when the viewer is being used with film strip of a narrower width than customary the pulling of the handle toward the operator will extend the mask shade toward the operator in the space between the top of the dome of the light source and the under surface of the plastic diffuser plate in the stage assembly, a cutout being provided in the side walls to permit the handle movement, to reduce extraneous light. The mask is long enough to extend completely across, i.e. from back to front, of each stage assembly. Also, if the operator during split vertical threading of film desires to examine the film on one stage side, he can shield the light by actuating the mask associated with the other stage. The tension factors and spring force of drum 246 are such that the mask remains at the position to which the masking shade is extended and the self reeling capability requires only a minimum of effort.

Further, it is to be pointed out that the X and Y movements parallel to the viewing stage, due to the structural arrangement, are within plus or minus .005" and thus minimize optical defocusing during scanning. The carriage locking system holds a carriage position against forces of ten pounds applied in any horizontal direction. Also, the maximum carriage resistance when unlocked, i.e. when the clutches are disengaged, does not exceed two pounds in either X or Y direction.

The rotary mounting ring for the microscope permits 360° rotation and the manual lock or break will not slip below twenty inch pounds of torque. The mounting ring is collimated with the viewing stage to align the optical axis normal to the glass surface to within three minutes of arc in the X direction and five minutes of arc in the Y direction. The relationship of the components of the Z feed are such that coarse focus adjustment on the Z axis produces .133 inch travel per revolution of the associated hand wheel or knob and .064 inch of travel per revolution of the fine focus hand wheel or knob. The component constructional parts of the X and Y feed means produce .133 inch travel per revolution of the adjustment controlling hand wheel or motorized shaft, as the case may be.

Thus, the film scanning and viewing means of this invention is ideally suited for ready interpreting, viewing and measuring co-ordinate points on wide strip film such as that used in aerial surveys. The film usually consists of individual frame pictures on a film strip with the pictures being taken from left and right positions for stereo viewing.

What is claimed is:

1. A film viewing means for viewing film for interpreting the same such as by stereo interpretation of strip type aerial photographs and the like, including means defining a film handling table, illumination means supported by such table, film transport means for moving a film strip across the table above said illumination means, an overhead carriage system operatively associated with said table and including a Y axis travel unit, an X axis travel unit, means for releasably coupling said units in superposed relation with said X axis travel unit uppermost, a Z axis travel unit carried by said X axis travel unit and including a rotary instrument supporting ring, feed means associated with the respective units for effecting adjustment of said instrument supporting ring along the X, Y and Z axes, and said feed means including a controllable gravity feed arrangement for adjustment along the Z axis which permits rapid instrument elevation but prevents overfeeding in a downward direction.

2. A film viewing means as claimed in claim 1 and a manually actuated clamping means acting indirectly on the rotary instrument supporting ring for adjusting said ring about the Z axis without applying deviating forces that would angularly or radially shift the Z axis.

3. A film viewing means as claimed in claim 1 in which the means releasably coupling said X axis travel unit to said Y axis travel unit includes cooperating aligning components carried by each unit and cooperating swingable latch and fixed catch means carried by the respective units.

4. A film viewing unit as claimed in claim 3 and said swingable latch and fixed catch means comprising a pair of latches carried by said Y travel unit, a pair of cooperating catches carried by said X travel unit, a second pair of latches carried by said X travel unit and a second pair of cooperating catches carried by said Y travel unit.

5 A film viewing unit as claimed in claim 3 and said cooperating alignment components comprising vertically disposed disc means carried by one of said X and Y travel units and cooperating plate means carried by the other of said X and Y travel units and having arcuate surfaces for mating with said disc means in aligning said units in superimposition.

6 A film viewing instrument as claimed in claim 5 and said fixed catch means including catch means on said plate means.

7. A film viewing means as claimed in claim 1 in which said Y axis travel unit includes spaced guide rails parallel to the Y axis, support means for said rails connected to said table, a housing means slidably mounted on each rail, supporting means extending between said housing means and connected thereto to maintain the same in parallelism, an X travel unit supporting plate connected to each housing means, said feed means including an idler sprocket supported in each housing means for rotation about aligned axes extending perpendicular to said rail means, another sprocket supported in each housing means with their respective axes in alignment in parallelism with but spaced above the aligned axes of the first mentioned idler sprockets, a shaft means interconnecting said last mentioned sprockets, a chain means fixed in parallelism with each rail means and passing over said second sprockets and beneath said first mentioned idler sprockets and means for turning said shaft means to effect displacement of said housing means and support plates carried thereby along the Y axis.

8. A film viewing means as claimed in claim 7 and said X travel unit including a rail means extending parallel to said shaft means, support means at each end of said rail means, the means for releasably connecting said X and Y travel units in superimposition connecting said support means to said supporting plates of the Y axis travel unit, a combined housing and Z axis travel unit support mounted on said rail means, spaced sprocket means carried by said rail means, a chain including opposite ends trained over said sprocket and having its ends connected to said combined housing and Z axis travel unit support and said feed means including means for turning one of said sprockets for effecting adjustment of said combined housing and Z axis travel unit support along the X axis.

9. A film viewing means as claimed in claim 8 in which the means for turning the shaft means to effect displacement along the Y axis and the means for turning one of said sprockets for effecting adjustment along the Y axis each includes a turnable drive means, including an electromagnetic clutch means, control means for said clutch means, said clutch means being series connected and said control means being operable to permit said turnable drive means to impart adjusting movements upon energization of said means or to permit free movements along both the X and Y axes with said clutch means deenergized.

10. A film viewing means as claimed in claim 9 in which said Z axis travel unit includes a guide connected to said combined housing and Z axis travel unit support, a slide operably related with said guide for movement along the Z axis, said rotary instrument supporting ring being connected to said slide, and control means carried by said slide and operably related between said first mentioned control means and said clutch means for deenergizing said clutch means to permit free manipulation of said guide and slide along the X and Y axes.

11. A film viewing means as claimed in claim 9 in which said Z axis travel unit includes a guide connected to said combined housing and Z axis travel unit support, a slide operably related with said guide for movement along the Z axis, said controllable gravity feed arrangement being operably related between said guide and slide, said rotary instrument supporting ring being connected to said slide and the feed means for said controllable gravity feed arrangement including turnable components carried by said guide and slide, respectively, for respectively effecting coarse and fine feed adjustments.

12. A film viewing means as claimed in claim 11 in which said controllable gravity feed arrangement includes sprockets spaced along the Z axis and carried by said slide, a pair of sprockets carried by said guide with one sprocket of said pair being above and laterally offset from the other sprocket of said pair both said last mentioned sprockets lying in the came plane as said first mentioned sprockets and an endless chain trained over said first mentioned sprockets and between the sprockets carried by said guide.

13. A film viewing means as claimed in claim 2 and a one way overrunning clutch means incorporated in the turnable components carried by said guide and said last mentioned clutch means being operably related with the lowermost one of said pair of sprockets carried by said guide.

14. A film viewing means as claimed in claim 1 and further including a two part viewing stage means, a film handling roller means carried by the mutually adjacent ends of the parts of said stage means and extending parallel to the Y axis, means for shifting said parts between a positioning in which said roller means are closely adjacent one another and a positioning in which said roller means are spaced apart to provide a gap between the stage parts.

15. A film viewing means as claimed in claim 14 and said film transport means including means cooperable with said film handling roller means when in said last mentioned positioning to provide for a split vertical threading configuration of two film strips.

16. A film viewing means as claimed in claim 14 and further including additional means cooperable with said film transport means and with said film handling roller means when in said last mentioned positioning to form and manipulate a loop in said film so that separated frames of said film may be placed side by side for comparison.

17. A film viewing means as claimed in claim 16 in which said additional means includes a second pair of film handling roller means movably mounted on said table and adapted to be moved down between said first mentioned roller means to form a loop in said film, means to move said second pair of roller means comprising a pair of chain lengths for each roller means of said second pair, a single sprocket mounting each chain length, track means on the table for each chain length and including chain length retaining portions to maintain said chain lengths in mesh with said sprockets and means to drive said sprockets to move said chain lengths and said second pair of roller means.

18. A film viewing means as claimed in claim 1 and said illumination means comprising a gas-filled tubular light element, a receptacle for said light element including a light-transmissive wall, means for filling said receptacle with and circulating therethrough over and under said tubular light element a light-transmissive electrically insulating fluid.

19. A film viewing means as claimed in claim 18 and said last mentioned means including fluid flow guiding means within the receptacle for constraining the fluid to flow in a tortuous path.

20. A film viewing means as claimed in claim 19 and said fluid flow guiding means comprising strips of shock absorbing, light reflecting material underlying said tubular light element.

21. A film viewing means as claimed in claim 18 and electric heating means operably associated with the means for filling and circulating said fluid to impart heat to said fluid and means for regulating the temperaure of the fluid to maintain the temperature of the tubular light element at a level establishing maximum light intensity output over a prolonged period of time without damaging said light element.

22. A film viewing means as claimed in claim 1 and a manually actuated clamping means acting indirectly on the rotary support ring for adjusting said ring about the Z axis without applying deviating forces that would angularly shift the ring relative to the Z axis comprising a brake ring carried by said rotary instrument supporting ring in spaced relation beneath the same and including a portion projecting beyond the one periphery of said rotary ring, said Z axis travel unit including a support journalling said rotary ring, a bore through said support parallel to but laterally displaced from said one periphery of the rotary ring, a C-block slidably mounted within said bore with the opening therein straddling the projecting portion of said brake ring, a clamping strip secured to said support on opposite sides of said C-block and including a portion passing through the opening in the C-block and underlying said projecting portion of said brake ring and means carried by the lower leg of said C-block for applying said portion of the clamping strip against the under surface of the projecting portion of said brake ring to clamp the same against the under surface of the upper leg of said C-block.

References Cited

UNITED STATES PATENTS

| | | | |
|---|---|---|---|
| 1,935,113 | 11/1933 | Crawford | 40—86AUX |
| 2,791,151 | 5/1957 | Pennington | 353—6 |
| 2,869,419 | 1/1959 | Bean | 350—136X |
| 3,464,766 | 9/1969 | Knauf | 350—136X |

ROBERT W. MICHELL, Primary Examiner

R. CARTER, Assistant Examiner

U.S. Cl. X.R.

350—135